United States Patent
Watanabe et al.

(10) Patent No.: US 7,808,575 B2
(45) Date of Patent: Oct. 5, 2010

(54) MATRIX-TYPE LIQUID CRYSTAL DISPLAY DEVICE

(75) Inventors: Jun Watanabe, Minami-Ashigara (JP); Junichi Hirakata, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 47 days.

(21) Appl. No.: 12/100,226

(22) Filed: Apr. 9, 2008

(65) Prior Publication Data

US 2008/0259246 A1    Oct. 23, 2008

(30) Foreign Application Priority Data

Apr. 10, 2007    (JP) .................... P2007-102733

(51) Int. Cl.
    *G02F 1/1335*    (2006.01)
(52) U.S. Cl. ........................ 349/64; 349/140
(58) Field of Classification Search ............ 349/64, 349/96, 179, 75, 193, 118, 119, 140, 141, 349/58
    See application file for complete search history.

(56) References Cited

U.S. PATENT DOCUMENTS

| | | | |
|---|---|---|---|
| 7,144,608 B2 * | 12/2006 | Paukshto et al. | ........... 428/1.31 |
| 7,176,995 B2 | 2/2007 | Jang et al. | |
| 7,201,510 B2 * | 4/2007 | Yamashita et al. | ........... 362/617 |
| 7,327,413 B2 * | 2/2008 | Hwang et al. | ................ 349/58 |
| 7,502,088 B2 * | 3/2009 | Suzuki et al. | ............... 349/141 |
| 2005/0162592 A1 * | 7/2005 | Hirakata et al. | ............ 349/119 |
| 2005/0195348 A1 * | 9/2005 | Saitoh et al. | ................ 349/118 |
| 2007/0229804 A1 | 10/2007 | Inoue et al. | |
| 2008/0259246 A1 | 10/2008 | Watanabe et al. | |
| 2008/0291371 A1 * | 11/2008 | Sato | ............................ 349/96 |
| 2009/0079910 A1 * | 3/2009 | Ito et al. | ....................... 349/75 |

FOREIGN PATENT DOCUMENTS

| | | |
|---|---|---|
| JP | 2003-270409 A | 9/2003 |
| JP | 3507719 B2 | 12/2003 |

* cited by examiner

*Primary Examiner*—Akm E Ullah
(74) *Attorney, Agent, or Firm*—Birch, Stewart, Kolasch and Birch, LLP

(57) ABSTRACT

A matrix-type liquid crystal display device, includes: a liquid crystal panel including: a pair of substrates disposed to face each other with at least one of the pair of substrates having an electrode; a liquid crystal layer interposed between the pair of substrates; a pair of polarizing plates disposed to sandwich the liquid crystal layer, each having a polarizing film and a protective film provided directly or indirectly on at least one surface of the polarizing film; and an optically compensatory film disposed in at least one of spaces between the liquid crystal layer and the pair of polarizing films; a backlight comprising a light source; a first optical member having a light-condensing property; and a second optical member having a surface scattering function.

7 Claims, 4 Drawing Sheets

MATRIX-TYPE LIQUID CRYSTAL DISPLAY DEVICE

BACKGROUND OF THE INVENTION

1. Field of the Invention

The present invention relates to a matrix-type liquid crystal display device.

2. Description of the Related Art

As regards the display device used, for example, as a monitor for OA devices such as word processor, notebook computer and personal computer, as well as in a mobile device or a television, CRT (cathode ray tube) has been heretofore mainly used. In recent years, a liquid crystal display is becoming widely used instead of CRT because of its small thickness, light weight and low power consumption. The liquid crystal display device comprises a liquid crystal cell and a polarizing plate. The polarizing plate is usually composed of a protective film and a polarizing film and is obtained by dyeing a polarizing film comprising a polyvinyl alcohol film with iodine, stretching the film and stacking a protective film on both surfaces of the film. In a transmission-type liquid crystal display device, this polarizing plate is fixed on both sides of a liquid crystal cell and in some cases, one or more optically compensatory sheets are further disposed. In a reflection-type liquid crystal display device, there are usually disposed a reflector plate, a liquid crystal cell, one or more optically compensatory sheets and a polarizing plate in this order. The liquid crystal cell usually comprises a liquid crystal molecule, two substrates for encapsulating the liquid crystal molecule, and an electrode layer for applying a voltage to the liquid crystal molecule. The liquid crystal cell displays an ON or OFF mode depending on the difference in the aligned state of liquid crystal molecules and can be applied to all of transmission-type, reflection-type and transflection-type display devices. Display modes such as TN (twisted nematic), IPS (in-plane switching), OCB (optically compensatory bend), VA (vertically aligned), ECB (electrically controlled birefringence), and STN (super twisted nematic) have been proposed.

The optically compensatory sheet is used in various liquid crystal display devices for eliminating the image coloration or enlarging the viewing angle. As for the optically compensatory sheet, a stretched birefringent polymer film has been conventionally used. Instead of the optically compensatory sheet comprising a stretched birefringent film, it is proposed to use an optically compensatory sheet comprising a transparent support having thereon an optically anisotropic layer formed of a low or high molecular liquid crystalline compound. The liquid crystalline compound has various orientation modes and therefore, by using a liquid crystalline compound, an optical property unobtainable by conventional stretched birefringent polymer films can be realized. Furthermore, this optically compensatory sheet functions also as a polarizing plate protective film.

On the other hand, in an image display device such as CRT, plasma display panel (PDP), electroluminescent display (ELD), field emission display (FED), surface-conduction electron-emitter display (SED) and liquid crystal display device (LCD), the display performance in a bright-room environment can be enhanced by preventing the display surface from a disturbing image reflection due to reflection of outside light.

As for the method of preventing a disturbing image reflection on the display surface of an image display device, there are disclosed (1) a method where a performance of blurring the contour of the disturbing reflection image by the effect of surface scattering (antiglare property) is imparted to make less recognizable the disturbing reflection image, and (2) a method where a performance of reducing the amount of reflected light (antireflection property) is imparted by providing a low refractive index layer on the outermost surface of the display surface and the disturbing reflection image is thereby made less recognizable (see, Japanese Patent No. 3,507,719 and JP-A-2003-270409 (the term "JP-A" as used herein means an "unexamined published Japanese patent application")).

In recent years, the market for applications using a display device with a large screen and allowing a user to watch a high-quality moving picture from a relatively distant position as typified, for example, by a liquid crystal television is rapidly expanding. In such an application, the display is required to show a clearer image. In the case where the antiglare property is strong, when a thing, a fluorescent lamp, a human being or the like located in the periphery of the display casts a disturbing reflection on the display surface, the contour of the image is blurred and the screen image on the display can be easily recognized (the disturbing reflection is decreased). However, the light brownish looking of the display surface is sometimes strengthened to decrease the contrast in a bright room (bright-room contrast). Also, a device for increasing the light intensity of the backlight to enhance the visibility in a bright room, for example, a light-condensing member such as prism sheet, is being used.

In the case where a clear surface without antiglare property is used, a low refractive index layer having a low refractive index at a level enabling satisfactory reduction of disturbing reflection cannot be realized only by the antireflection utilizing thin-film interference of one low refractive index layer, and when thin-film interference by two or more layers differing in the refractive index is used, strong color tint and cost rise may be incurred.

Accordingly, a light-scattering film ensuring reduced disturbing reflection and enhanced bright-room contrast is being demanded. Also, a light-scattering film optimal for an image display device with a large screen and ensuring reduced disturbing reflection and enhanced bright-room contrast is being demanded.

SUMMARY OF THE INVENTION

However, in a liquid crystal display device having the above-described scattering film, when an optical member having a light-condensing function is disposed between the backlight and the liquid crystal layer, a fringe-like or concentric display unevenness called moire is generated due to optical interference with the pixel of the liquid crystal layer. An aspect of the present invention is to eliminate this problem of interference pattern and provide a liquid crystal display device endowed with wide viewing angle characteristics and broad color reproducibility.

The optical member having a light-condensing property described in this specification is a member for condensing diffusion light emitted from a backlight into the normal direction of the screen of a liquid crystal display device or an arbitrary direction. As typified by a lens sheet, the optical member having a light-condensing property described in this specification represents an optical member having a concave-convex structure like a lens shape on its surface. Also, the optical member having a light-condensing property which has a linear periodic concave-convex structure means an optical member having a light-condensing property in which concave-convex structures are arranged in a ribbed shape, and in particular, represents a lenticular lens sheet and a prism sheet as shown in FIG. 7 or an optical member having a light-condensing property which has an intermediate shape there between.

In the present invention, as the means for solving those problems, it has been found, for example, to dispose a surface scattering film or intersect the pitch patterns of the optical sheet and the pixel. That is, the means for attaining the above-described aspect are as follows.

(1) A matrix-type liquid crystal display device, comprising:
a liquid crystal panel comprising:
a pair of substrates disposed to face each other with at least one of the pair of substrates having an electrode;
a liquid crystal layer interposed between the pair of substrates;
a pair of polarizing plates disposed to sandwich the liquid crystal layer, each having a polarizing film and a protective film provided directly or indirectly on at least one surface of the polarizing film; and
an optically compensatory film disposed in at least one of spaces between the liquid crystal layer and the pair of polarizing films;
a backlight comprising a light source;
a first optical member having a light-condensing property; and
a second optical member having a surface scattering function.

(2) The matrix-type liquid crystal display device as described in (1) above,
wherein the first optical member having a light-condensing property collects light by a periodic concave-convex structure and a pitch of the periodic concave-convex structure is smaller than a periodicity pitch of display pixels.

(3) The matrix-type liquid crystal display device as described in (1) or (2) above,
wherein the first optical member having a light-condensing property has a linear periodic concave-convex structure and a direction of the linear periodic concave-convex structure intersects a direction of pixel periodicity.

(4) The matrix-type liquid crystal display device as described in any of (1) to (3) above,
wherein the second optical member having a surface scattering function is disposed directly or indirectly on a surface of the protective film of the polarizing film on a backlight side.

(5) The matrix-type liquid crystal display device as described in any of (1) to (4) above,
wherein the second optical member having a surface scattering function is a light-scattering film comprising:
a transparent support; and
at least a light-scattering layer directly or indirectly on the transparent support, and
wherein in the light-scattering film, assuming that when nearly parallel light rays are made incident on a surface of the light-scattering film at an incident angle of 5°, a reflectance for an angle θ in a light-receiving part measured in a plane containing a film normal line and an incident direction is R(θ) and a value obtained by normalizing R(θ) by a reflectance of regular reflection is Rrel(θ) and further that a value calculated from the maximum variation |dRrel(θ)/dθ|max for the angle θ is a scattering coefficient A (formula 1), a reflection coefficient B (formula 2) calculated from the scattering coefficient A and a 5° specular reflectance Rs is from 1.5 to 4.5:

Scattering coefficient $A = 1/|dRrel(\theta)/d\theta|max$ (Formula 1)

Reflection coefficient $B = 2.2 \times \log 10(Rs) - 7.5 \times \log 10(A) + 5.9$. (Formula 2)

(6) The matrix-type liquid crystal display device as described in any of (1) to (5) above,
wherein the scattering coefficient A is from 1.5 to 4.5.

(7) The matrix-type liquid crystal display device as described in any of (1) to (6) above, which is in a vertically aligned display mode.

DETAILED DESCRIPTION OF THE INVENTION

Figure 1:
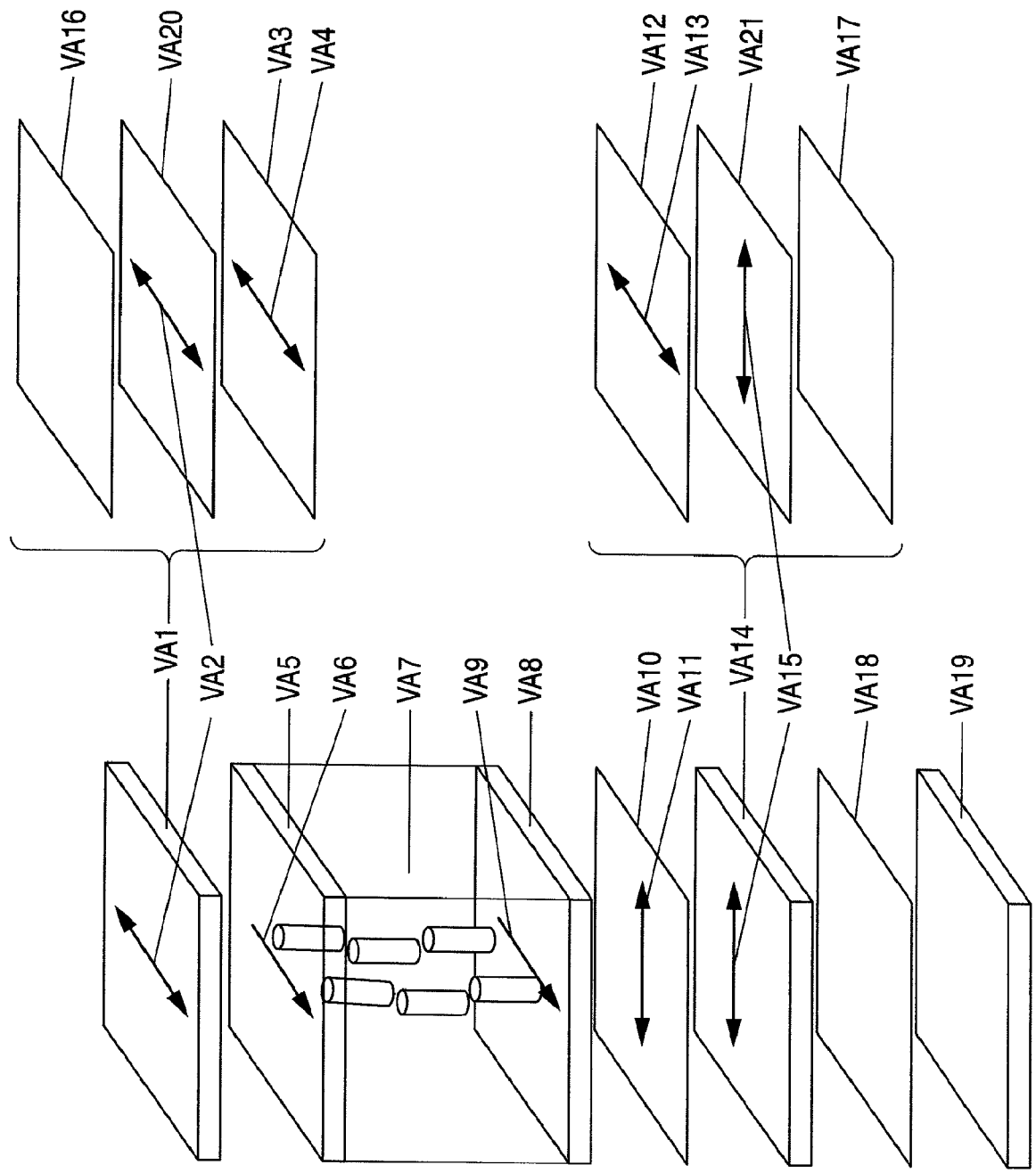
FIG. 1 represents a schematic view showing one exemplary embodiment of the liquid crystal display device.

The terms used in the context of the present invention are descried below.

[Description of Terms]
In the case where "in parallel", "at right angles", "crossing (or intersecting)", "at 45°" or the like is used with respect to the angle between respective axes or directions, this means "almost in parallel", "almost at right angles", "neither in parallel nor at right angles" or "almost at 45°" and is not used in a strict sense, and some margin of error is allowed within the range of achieving the purpose. For example, "in parallel" means that the crossing angle is approximately 0°, that is, from −10° to 10°, preferably from −5° to 5°, more preferably from −3° to 3°; "at right angles" means that the crossing angle is approximately 90°, that is, from 80° to 100°, preferably from 85° to 95°, more preferably from 87° to 93°; "crossing (or intersecting)" means a range which is neither "in parallel" nor "at right angles"; and "at 45°" means that the crossing angle is approximately 45°, that is, from 35° to 55°, preferably from 40° to 50°, more preferably from 42° to 48°.

In the context of the present invention, unless otherwise indicated, the term "polarizing plate" is used to include both a lengthy polarizing plate and a polarizing plate cut into a size suitable for the incorporation into a liquid crystal display device (in the context of the present invention, "cut" includes "punch", "clip" and the like). Also, although the "polarizing film" and the "polarizing plate" are differentiated in the context of the present invention, the "polarizing plate" means a laminate where a "polarizing film" has at least on one surface thereof a protective film for protecting the polarizing film. The polarizing plate sometimes contains an optically compensatory film and in this case, may take a construction allowing the protective film to serve also as the optically compensatory film. In the case where the optically compensatory film is formed by stacking an optically anisotropic layer having a liquid crystal molecule on a support, there may be employed a construction allowing the protective film to serve also as the support of the optically compensatory film. Furthermore, the polarizing plate for use in the present invention may contain a support. The "optically compensatory film" is sometimes used in the same meaning as the optically anisotropic layer or the optical compensation film.

The present invention is described in detail below.

<Liquid Crystal Display Device>

[Construction of Liquid Crystal Display Device]

The liquid crystal display device of the present invention is a liquid crystal display device comprising a pair of substrates disposed to face each other with at least one substrate having an electrode, a liquid crystal cell composed of a liquid crystal layer being sandwiched between those substrates and containing a nematic liquid crystal material which aligns nearly vertically to the surfaces of the pair of substrates when not applying a voltage, and a polarizing plate disposed at least on one surface outside of the liquid crystal cell, wherein the polarizing plate has a first protective film, a polarizing film, a second protective film and a light-diffusing layer in this order.

The liquid crystal display device of the present invention is preferably a VA-type liquid crystal display device, an TN-type liquid crystal display device, an OCB-type liquid crystal display device, or an IPS-type liquid crystal display device.

The VA-type liquid crystal display device takes a normally black mode of displaying black in a voltage-substantially-non-applied state and displaying white resulting from elevation of transmittance in a voltage-applied state. The black display is obtained when the Re value of the optically compensatory film agrees with the retardation value of the liquid crystal layer in a voltage-non-applied state. When such a construction is employed, a high-contrast image can be obtained over a wide range and tone reversal does not occur even in a gradation display region. In addition, in the present invention, image quality having high screen evenness can be obtained, thereby a liquid crystal display device having comprehensively high display appearance quality can be obtained.

The liquid crystal display device shown in FIG. 1 comprises a liquid crystal cell (VA5 to VA9), and an upper polarizing plate VA1 and a lower polarizing plate VA14 disposed to sandwich the liquid crystal cell. The polarizing plate includes a polarizing film and a pair of transparent protective films sandwiching the polarizing film, but in FIG. 1, this is shown as an integrated polarizing plate and details of the structure are omitted. The VA-mode liquid crystal display is produced by interposing a liquid crystal having negative dielectric anisotropy with approximately Δn=0.0813 and Δ∈=4.6 (for example, MLC-6608, produced by Merck Ltd.) between upper and lower electrode substrates while setting the director indicative of the aligning direction of liquid crystal molecules, so-called the tilt angle with respect to the substrate surface, to about 89° by means of rubbing orientation, etc. The thickness d of the liquid crystal layer VA7 is set to 3.5 μm. Here, the brightness at the white display time varies depending on the size of the product Δnd of thickness d and refractive index anisotropy Δn. Therefore, the thickness of the liquid crystal layer is set to the range from 0.2 to 0.5 μm, preferably from 0.25 to 0.35 μm, so as to obtain maximum brightness.

The polarizing plates outside of the liquid crystal cell are stacked such that the absorption axis VA2 of the upper polarizing plate VA1 and the absorption axis VA15 of the lower polarizing plate VA14 cross nearly at right angles. A transparent electrode (not shown) is formed inside of each oriented film of the upper electrode substrate VA5 and the lower electrode substrate VA8. In the non-driven state of not applying a driving voltage to the electrodes, the liquid crystal molecules in the liquid crystal layer are aligned nearly vertically to the substrate surface as in the liquid crystal layer VA7, and the polarizing state of light passing through the liquid crystal panel is scarcely changed. That is, the liquid crystal display device realizes an ideal black display in the non-driven state. On the other hand, in the driven state, the liquid crystal molecules are tilted nearly in parallel to the electrode substrate surface, and the polarizing state of light passing through the liquid crystal panel is changed by these tilted liquid crystal molecules. In other words, the liquid crystal display provides a white display in the driven state.

In the example above, an electric field is applied between upper and lower substrates and therefore, a liquid crystal material having negative dielectric anisotropy is used so that the liquid crystal molecule can respond vertically with respect to the electric field direction. In the case where the electrodes are disposed on one electrode substrate and the electric field is applied in the transverse direction parallel to the substrate surface, a liquid crystal material having positive dielectric anisotropy is used. In the VA-mode liquid crystal display, addition of a chiral material generally employed in a TN-mode liquid crystal display causes deterioration in the dynamic response characteristics and therefore, a chiral compound is used less often but in some cases, may be added for reducing the alignment failure.

The characteristic features of the VA mode are high-speed response and high contrast. However, this mode has a problem that the contrast is high at the front but decreases in the oblique direction. At the black display time, the liquid crystal molecules are aligned vertically to the substrate surface. When viewed from the front, high contrast is obtained because the liquid crystal molecule has almost no birefringence and the transmittance is low. However, when viewed from an oblique direction, birefringence is produced in the liquid crystal molecule. Furthermore, the crossing angle between absorption axes of the upper and lower polarizing plates is a right angle of 90° at the front but exceeds 90° when viewed obliquely. Because of these two factors, light leakage occurs in the oblique direction and the contrast decreases. In order to solve this problem, an optically compensatory sheet (in FIG. 1, an upper optically anisotropic layer VA3, a lower optically anisotropic layer 1 VA10 and a lower optically anisotropic layer 2 VA12) is preferably disposed. At the white display time, the liquid crystal molecules are tilted, but the size of birefringence of the liquid crystal molecule when viewed from an oblique direction greatly differs between the tilted direction and the opposite direction, and there arises a difference in the brightness or color tone. In order to solve this problem, there is employed a structure called a multi-domain structure where one pixel of the liquid crystal display device is divided into a plurality of regions.

In the embodiment of the transmission-type liquid crystal display device of the present invention shown in FIG. 1, out of the cellulose acylate films used as the protective film, the protective films VA3 and VA12 on the liquid crystal cell side may be the same or different. Also, VA3 and VA12 each may be used to serve as both a protective film and an optically compensatory sheet.

The surface film (VA16 and VA17) in FIG. 1 may be a normal cellulose acylate film, and the thickness thereof is preferably smaller than that of the cellulose acylate film preferably used in the present invention. For example, the thickness is preferably from 40 to 80 µm. Examples of such a cellulose acylate film include, but are not limited to, commercially available "KC4UX2M" {produced by Konica Opto Corp., 40 µm}, "KC5UX" {produced by Konica Opto Corp., 60 µm} and "TD80UL" {produced by FUJIFILM Corporation, 80 µm}.

Incidentally, the embodiment of the VA-mode liquid crystal display device is shown in FIG. 1, but the liquid crystal display device of the present invention may be in an embodiment of TN mode, IPS mode, OCB mode or ECB mode. Furthermore, in the liquid crystal display device of each display mode, when a structure called a multi-domain structure of dividing one pixel into a plurality of regions is employed, viewing angle characteristics in the up/down and right/left directions are averaged and the display quality is enhanced.

Also, the liquid crystal display device of the present invention is not limited to the construction shown in FIG. 1 and may contain other members. For example, a color filter may be disposed between the liquid crystal cell and the polarizing film. In use as a transmission-type liquid crystal display device, a cold cathode or hot cathode fluorescent tube or a backlight using, as the light source, a light-emitting diode, a field emission element or an electroluminescent element may be disposed on the back side. The liquid crystal display device of the present invention may be a reflection-type liquid crystal display device. In this case, only one polarizing plate may be disposed on the viewing side, and a reflective film is provided on the back side of the liquid crystal cell or on the inner surface of the lower-side substrate of the liquid crystal cell. Of course, a frontlight using the light source above may be provided on the viewing side of the liquid crystal cell. Furthermore, in order to favor both transmission and reflection modes, the liquid crystal display device of the present invention may be a transflective type where a reflection area and a transmission area are provided in one pixel of the display device.

For the purpose of increasing the emission efficiency of the backlight VA19, a prism-like or lens-like light concentration-type brightness-enhancing sheet (film) VA18 may be stacked, or a polarized light reflection-type brightness-enhancing sheet (film) capable of improving the light loss due to absorption by the polarizing plate may be stacked between the backlight and the liquid crystal cell. Also, a diffusing sheet (film) for equalizing the light source of the backlight may be stacked or conversely, a sheet (film) having formed thereon a reflection or diffusion pattern for creating an in-plane distribution in the light source may be stacked.

The liquid crystal display device of the present invention includes an image direct view type, an image projection type and an optical modulation type. In a particularly effective embodiment, the present invention is applied to an active matrix liquid crystal display device using a 3-terminal or 2-terminal semiconductor device such as TFT or MIM. Of course, the embodiment of applying the present invention to a passive matrix liquid crystal display device as typified by an STN type called a time-division driving mode is also effective.

[Viewing Angle of White Brightness]

In the context of the present invention, the range of a polar angle (angle inclined from the normal line) giving a white brightness of 50% based on the white brightness at the front is referred to as a viewing angle of white brightness. In the present invention, a viewing angle such that the viewing angle of white brightness is a polar angle of 50° or more in all azimuthal angles is realized.

[Color Tint of Black Display]

The color tint at the front depends on the polarizing film, but the color tint from an oblique direction varies according to the wavelength dispersion of the optically anisotropic layer of the optically compensatory sheet and the wavelength dispersion of the liquid crystal used in the cell. Also, the transmittance of each pixel of R, G and B can be made minimum by adjusting the cell gap of each pixel of R, G and B.

[Support]

The transparent support of the optically compensatory sheet (VA3, VA10 and VA12) comprises at least one polymer film. The transparent support may be composed of a plurality of polymer films so as to achieve the optical anisotropy defined in the present invention. However, the optical anisotropy defined in the present invention can be realized also by one polymer film. Accordingly, the transparent support preferably comprises one polymer film. The optical anisotropy of the transparent support is specifically such that the Re retardation value measured with light at a wavelength of 632.8 nm is in the range from 10 to 70 nm and the Rth retardation value measured with light at a wavelength of 632.8 nm is in the range from 50 to 400 nm. Incidentally, in the case of using two optically anisotropic polymer films in the liquid crystal display device, the Rth retardation value of one film is preferably from 50 to 200 nm. In the case of using one optically anisotropic polymer film in the liquid crystal display device, the Rth retardation value of the film is preferably from 70 to 400 nm.

The average slow axis angle of the polymer film is preferably 3° or less, more preferably 2° or less, and most preferably 1° or less. The direction of the average slow axis angle is defined as the average direction of the slow axis. The standard deviation of the slow axis angle is preferably 1.5° or less, more preferably 0.8° or less, and most preferably 0.4° or less. Assuming that the stretch direction of the polymer film is a baseline (0°), the angle of the slow axis in the polymer film plane is defined as the angle made by the slow axis and the baseline. In the case of stretching a roll-form film in the width direction, the width direction is the baseline, and in the case of stretching the film in the longitudinal direction, the longitudinal direction is the baseline.

The light transmittance of the polymer film is preferably 80% or more. The polymer film preferably has a photoelastic coefficient of $60 \times 10^{-12}$ m$^2$/N or less.

In the transmission-type liquid crystal display device using an optically compensatory sheet, "frame-like display unevenness" is sometimes generated in the peripheral part of the screen with the lapse of time after energization. This unevenness is brought about due to elevation of the transmittance in the peripheral part of the screen and becomes prominent particularly at the black display time. In the transmission-type liquid crystal display device, heat is generated from the backlight and moreover, a temperature distribution is produced in the liquid crystal cell plane. The optical characteristics (e.g., retardation value, slow axis angle) of the optically compensatory sheet are changed by the temperature distribution and this is a cause of the generation of "frame-like display unevenness". The change in the optical characteristics of the optically compensatory sheet is attributable to the fact that expansion or shrinkage of the optically compensatory sheet, which occurs resulting from elevation of the temperature, is constrained by adhesion to the liquid crystal cell or polarizing plate and the optically compensatory sheet is thereby obliged to undergo elastic deformation.

In order to prevent the "display unevenness" from occurring in the transmission-type liquid crystal display device, a polymer having a high thermal conductivity is preferably used for the transparent support of the optically compensatory sheet. Examples of the polymer having a high thermal conductivity include a cellulose-based polymer such as cellulose acetate (thermal conductivity thereinafter the same): 0.22 W/(m·K)), a polyester-based polymer such as polycarbonate (0.19 W/(m·K)), and a cyclic olefin polymer such as norbornene-based polymer (0.20 W/(m·K)). Examples of the commercially available polymer which can be used include a commercially available norbornene-based polymer (e.g., ARTON produced by JSR Corp., ZEONOA produced by Zeon Corp., ZEONEX produced by Zeon Corp.). The polycarbonate-based copolymer is described in JP-A-10-176046 and JP-A-2001-253960.

The polymer having a high thermal conductivity is preferably a cellulose-based polymer, more preferably a cellulose ester, still more preferably a lower fatty acid ester of cellulose. The lower fatty acid means a fatty acid having a carbon number of 6 or less. The number of carbon atoms is preferably 2 (cellulose acetate), 3 (cellulose propionate) or 4 (cellulose butyrate). A mixed fatty acid ester such as cellulose acetate propionate and cellulose acetate butyrate may also be used.

Above all, the polymer having a high thermal conductivity is preferably a cellulose acetate (cellulose diacetate or cellulose triacetate), and most preferably a cellulose triacetate having an acetylation degree of 59.0 to 61.5%. The term "acetylation degree" means an amount of acetic acid bonded per unit mass of cellulose. The acetylation degree is determined according to the measurement and calculation of acetylation degree described in ASTM: D-817-91 (Test Methods of Cellulose Acetate, etc.).

The viscosity average polymerization degree (DP) of the polymer is preferably 250 or more, more preferably 290 or more. Also, in the polymer, the molecular weight distribution of Mm/Mn (Mm is a mass average molecular weight and Mn is a number average molecular weight) as measured by gel permeation chromatography is preferably narrow. Specifically, the Mm/Mn value is preferably from 2.0 to 4.0, more preferably from 2.0 to 3.0.

In order to adjust the retardation of the polymer film, an aromatic compound having at least two aromatic rings may be used as a retardation raising agent. In the case of using a cellulose acetate film as the polymer film, the aromatic compound is used in an amount of 0.01 to 20 parts by mass per 100 parts by mass of the cellulose acylate. (In this specification, mass ratio is equal to weight ratio.)

The aromatic compound is preferably used in a range from 0.05 to 15 parts by mass, more preferably from 0.1 to 10 parts by mass, per 100 parts by mass of the cellulose acetate. Also, two or more kinds of aromatic compounds may be used in combination. The aromatic ring of the aromatic compound includes not only an aromatic hydrocarbon ring but also an aromatic hetero ring.

The molecular weight of the retardation raising agent is preferably from 300 to 800. The retardation raising agent is described in JP-A-2000-111914, JP-A-2000-275434, JP-A-2001-166144, and International Publication No. 00/02615, pamphlet.

In the present invention, the production method of the polymer film is not particularly limited, but a solvent casting method is preferred. In the solvent casting method, the film is produced using a solution (dope) prepared by dissolving the polymer in an organic solvent. The organic solvent preferably contains a solvent selected from the group consisting of an ether having a carbon number of 2 to 12, a ketone having a carbon number of 3 to 12, an ester having a carbon number 2 to 12, and a halogenated hydrocarbon having a carbon number of 1 to 6.

The ether, ketone and ester each may have a cyclic structure. A compound having two or more functional groups of an ester, a ketone and an ether (that is, —O—, —CO— and —COO—) may also be used as the organic solvent. The organic solvent may have other functional groups such as alcoholic hydroxyl group.

Examples of the ether include diisopropyl ether, dimethoxymethane, dimethoxyethane, 1,4-dioxane, 1,3-dioxolane, tetrahydrofuran, anisole and phenetole. Examples of the ketone include acetone, methyl ethyl ketone, diethyl ketone, diisobutyl ketone, cyclohexanone and methylcyclohexanone. Examples of the ester include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol. The carbon number of the halogenated hydrocarbon is preferably 1 or 2, and most preferably 1. The halogen of the halogenated hydrocarbon is preferably chlorine, and the ratio at which the hydrogen atom of the halogenated hydrocarbon is substituted by a halogen is preferably from 25 to 75 mol %, more preferably from 30 to 70 mol %, still more preferably from 35 to 65 mol %, and most preferably from 40 to 60 mol %. A representative halogenated hydrocarbon is methylene chloride. Two or more kinds of organic solvents may be mixed and used.

In the present invention, the polymer solution may be prepared by a general method. The general method means to perform the processing at a temperature of 0° C. or more (ordinary temperature or high temperature). The solution can be prepared using the method and apparatus for the preparation of a dope in the ordinary solvent casting method. In the case of a general method, a halogenated hydrocarbon (in particular, methylene chloride) is preferably used as the organic solvent. The amount of the polymer is adjusted to give a polymer content of 10 to 40 mass % in the solution obtained. The amount of the polymer is more preferably from 10 to 30 mass %. In the organic solvent (main solvent), an arbitrary additive described later may be added. The solution can be prepared by stirring the polymer and the organic solvent at an ordinary temperature (0 to 40° C.). A solution having a high concentration may be stirred under pressure and heating. Specifically, the polymer and the organic solvent are charged into a pressure vessel and after tightly closing the vessel, the mixture is stirred under pressure while heating it at a temperature from not less than the boiling point of the solvent at ordinary temperature to a temperature not allowing for boiling of the solvent. The heating temperature is usually 40° C. or more, preferably from 60 to 200° C., more preferably from 80 to 110° C.

Respective components may be charged into the vessel after roughly mixing these in advance or may be sequentially charged into the vessel. The vessel must be constructed to enable the stirring. The pressurization of the vessel may be performed by injecting an inert gas such as nitrogen gas or by utilizing an increase in the vapor pressure of the solvent due to heating. Alternatively, the components may be added under pressure after tightly closing the vessel.

In the case of heating the system, heating from outside of the vessel is preferred. For example, a jacket-type heating device may be used. Also, the entire vessel may be heated by providing a plate heater outside of the vessel and circulating a liquid through piping. The stirring is preferably performed using a stirring blade by providing the blade inside of the vessel. The stirring blade is preferably long enough to reach the vicinity of the vessel wall. At the end of the stirring blade, a scraping blade is preferably provided for renewing the liquid film on the vessel wall.

In the vessel, measuring gauges such as manometer and thermometer may be provided. In the vessel, respective components are dissolved in the solvent. The dope prepared is taken out of the vessel, or the dope taken out is cooled using a heat exchanger or the like.

The polymer solution (dope) may also be prepared according to a cooling dissolution method. First, the polymer is gradually added to the organic solvent with stirring at a temperature in the vicinity of room temperature (from −10 to 40° C.). In the case of using a plurality of solvents, the order of addition is not particularly limited. For example, after adding the polymer to the main solvent, other solvents (e.g., alcohol as gelling solvent) may be used. Conversely, the polymer previously wetted with the gelling solvent may be added to the main solvent, and this is effective in preventing nonuniform dissolution. The amount of the polymer is preferably adjusted to give a polymer content of 10 to 40 mass % in the mixture.

The amount of the polymer is more preferably from 10 to 30 mass %. Furthermore, an arbitrary additive described later may be added to the mixture.

The mixture is then cooled to a temperature of −100 to −10° C. (preferably from −80 to −10° C., more preferably from −50 to −20° C., and most preferably from −50 to −30° C.). The cooling may be performed, for example, in a dry ice•methanol bath (−75° C.) or in a cooled diethylene glycol solution (from −30 to −20° C.). When cooled in this way, the mixture of the polymer and the organic solvent is solidified. The cooling rate is not particularly limited, but in the case of cooling in batch system, the viscosity of the polymer solution increases along with cooling to result in poor cooling efficiency and therefore, an efficient dissolution oven needs to be used for reaching the predetermined cooling temperature.

In the cooling dissolution method, the polymer solution after being swelled may be transferred in a short time through a cooling device cooled to a predetermined cooling temperature. The cooling rate is preferably as high as possible, but the theoretical upper limit is 10,000° C./sec, the technical upper limit is 1,000° C./sec, and the practical upper limit is 100° C./sec. The cooling rate is a value obtained by dividing the difference between the temperature at the start of cooling and the final cooling temperature by the time required to reach the final cooling temperature. Furthermore, when the mixture is warmed to a temperature of 0 to 200° C. (preferably from 0 to 150° C., more preferably from 0 to 120° C., and most preferably from 0 to 50° C.), a solution allowing the polymer to flow in the organic solvent is obtained. As for the temperature rise, the mixture may be merely left standing at room temperature or may be warmed in a hot bath.

In this way, a uniform solution is obtained. In the case where the dissolution is insufficient, the cooling and warming operations may be repeated. Whether dissolution is sufficient or not can be judged simply by observing the outer appearance of the solution with an eye. In the cooling dissolution method, a closed vessel is preferably used so as to avoid mingling of water due to dew condensation at the cooling. Also, in the cooling and warming operations, when the pressure is applied at the cooling and reduced at the warming, the dissolution time can be shortened. In order to apply or reduce the pressure, a pressure-resistant vessel is preferably used.

In a 20 mass % solution obtained by dissolving cellulose acetate (acetylation degree: 60.9%, viscosity average polymerization degree: 299) in methyl acetate by the cooling dissolution method, a pseudo-phase transition point between a sol state and a gel state exists in the vicinity of 33° C. according to differential scanning calorimetry (DSC) and the solution turns into a uniform gel state below this temperature. Therefore, the solution must be stored at a temperature not less than the pseudo-phase transition temperature, preferably at a temperature of pseudo-phase transition temperature+ about 10° C. However, this pseudo-phase transition temperature varies depending on the acetylation degree of cellulose acetate, the viscosity average polymerization degree, the concentration of solution, or the organic solvent used.

A polymer film is produced from the prepared polymer solution (dope) by a solvent casting method. The above-described retardation raising agent is preferably added to the dope.

The dope is cast on a drum or a band, and the solvent is evaporated to form a film. The concentration of the dope before casting is preferably adjusted to give a solid content of 10 to 40%, more preferably from 15 to 35%. The surface of the drum or band is preferably mirror-finished. The casting and drying methods in the solvent casting method are described in U.S. Pat. Nos. 2,336,310, 2,367,603, 492,078, 2,492,977, 2,492,978, 2,607,704, 2,739,069 and 2,739,070, British Patents 640731 and 736892, JP-B-45-4554 (the term "JP-B" as used herein means an "examined Japanese patent publication"), JP-B-49-5614, JP-A-60-176834, JP-A-60-203430 and JP-A-62-115035. The dope is preferably cast on a drum or band at a surface temperature of 40° C. or less. After casting, air is preferably blown thereon for 2 seconds or more to dry the dope. The obtained film is separated from the drum or band and may be further dried with hot air by successively changing the temperature from 100 to 160° C. to evaporate the residual solvent. This method is described in JP-B-5-17844. According to this method, the time from casting until separation can be shortened. In order to implement this method, the dope needs to be gelled at the surface temperature of the drum or band during casting.

In the present invention, a plurality of polymer solutions may be cast. In the case of casting a plurality of polymer solutions, the film can be produced while stacking layers by casting the polymer-containing solutions respectively from a plurality of casting ports provided at intervals in the travelling direction of the support (see, JP-A-61-158414, JP-A-1-122419 and JP-A-11-198285). Also, the film can be produced by casting the polymer solutions from two casting ports (see, JP-B-60-27562, JP-A-61-94724, JP-A-61-947245, JP-A-61-104813, JP-A-61-158413 and JP-A-6-134933). Furthermore, a polymer film casting method of enclosing a high-viscosity polymer solution flow with a low-viscosity polymer solution and simultaneously extruding the high-viscosity and low-viscosity polymer solutions (see, JP-A-56-162617) may also be employed.

In the present invention, there may be also performed a method of producing a film by using two casting ports, where a film cast from a first casting port and formed on a support is separated and second casting is applied to the side which has been in contact with the support surface (see, JP-B-44-20235). The plurality of polymer solutions may be the same solution. When different functions are intended to impart to a plurality of polymer layers, this may be attained by extruding polymer solutions according to the functions from respective casting ports.

The polymer solution may also be cast simultaneously with other functional layers (e.g., adhesive layer, dye layer, antistatic layer, antihalation layer, UV absorbing layer, polarizing layer). Many of conventional single-layer solutions have a problem that a polymer solution having a high concentration and a high viscosity must be extruded so as to obtain the required film thickness and in this case, the stability of the polymer solution is bad to allow for production of a solid matter giving rise to particle failure or poor planarity. For solving this problem, a plurality of polymer solutions are cast from casting ports, whereby high-viscosity solutions can be simultaneously extruded on a support and not only the planarity can be improved but also a film having excellent surface state can be produced. Furthermore, the drying load can be reduced by virtue of using thick polymer solutions and the film production speed can be elevated.

In the polymer film, a plasticizer may be added for improving the mechanical properties or increasing the drying speed. The plasticizer is preferably a phosphoric acid ester or a carboxylic acid ester. Examples of the phosphoric acid ester include triphenyl phosphate (TPP) and tricresyl phosphate (TCP). Representative carboxylic esters are a phthalic acid ester and a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include triethyl O-acetylcitrate (OACTE) and tributyl O-acetylcitrate (OACTB). Other examples of the carboxylic acid ester include butyl oleate, methylacetyl ricinoleate, dibutyl sebacate, and various trimellitic acid esters. A phthalic acid ester-based plasticizer (DMP, DEP, DBP, DOP, DPP and DEEP) is preferred, and DEP and DPP are more preferred.

The amount of the plasticizer is preferably from 0.1 to 25 mass %, more preferably from 1 to 20 mass %, and most preferably from 3 to 15 mass %, based on the amount of the polymer.

In the polymer film, a deterioration inhibitor (e.g., antioxidant, peroxide decomposing agent, radical inhibitor, metal inactivating agent, oxygen scavenger, amine) may be added. The deterioration inhibitor is described in JP-A-3-199201, JP-A-5-1907073, JP-A-5-194789, JP-A-5-271471, and JP-A-6-107854. The amount of the deterioration inhibitor added is preferably from 0.01 to 1 mass %, more preferably from 0.01 to 0.2 mass %, based on the solution (dope) prepared. If the amount added is less than 0.01 mass %, the effect of the deterioration inhibitor is scarcely recognized, whereas if the amount added exceeds 1 mass %, the deterioration inhibitor may bleed out to the surface of the film. Above all, butylated hydroxytoluene (BHT) and tribenzylamine (TBA) are preferred as the deterioration inhibitor.

The produced polymer film may be further subjected to a stretching treatment to adjust the retardation. The stretch ratio is preferably from 3 to 100%. The thickness of the polymer film after stretching is preferably 20 to 200 µm, more preferably from 30 to 100 µm. The standard deviation of the slow axis angle of the optically compensatory sheet can be reduced by adjusting the stretching treatment conditions. The stretching treatment can be performed using a tenter.

At the time of transversely tenter-stretching the film produced by a solvent casting method, the standard deviation of the slow axis angle of the film can be reduced by controlling the condition of the film after stretching. Specifically, a stretching treatment for adjusting the retardation value is performed using a tenter, and the polymer film immediately after stretching is kept at a temperature in the vicinity of the glass transition temperature of the film to maintain a stretch ratio between the maximum stretch ratio and the stretch ratio of one-half of the maximum stretch ratio, whereby the standard deviation of the slow axis angle can be reduced. If the film is kept at a temperature lower than the glass transition temperature, the standard deviation increases. The standard deviation of the slow axis can also be reduced by increasing the distance between rolls at the time of performing longitudinal stretching between the rolls.

In the case of causing the polymer film to function as a transparent protective film for the polarizing film in addition to the function as a transparent support of the optically compensatory sheet, the polymer film is preferably subjected to a surface treatment.

As for the surface treatment, a corona discharge treatment, a glow discharge treatment, a flame treatment, an acid treatment, an alkali treatment, or an ultraviolet irradiation treatment is performed. An acid treatment or an alkali treatment is preferred, and an alkali treatment is more preferred. In the case where the polymer is cellulose acetate, the acid treatment or alkali treatment is performed as a saponification treatment.

<Elliptically Polarizing Plate>

In the present invention, an elliptically polarizing plate where the above-described optically compensatory film is integrated with a linearly polarizing film may be used. The elliptically polarizing plate is preferably formed to have nearly the same shape as the pair of substrates constituting the liquid crystal cell so as to enable its direct incorporation into the liquid crystal display device (for example, when the liquid crystal cell is rectangular, the elliptically polarizing plate is also preferably formed to have the same rectangular shape). In the present invention, the orientation axis of the substrate of the liquid crystal cell, the absorption axis of the linearly polarizing film, and/or the orientation axis of the optically anisotropic layer each is adjusted to a specific angle.

The elliptically polarizing plate can be produced by stacking the above-described optically compensatory sheet and a linearly polarizing film (hereinafter, when simply referred to as a "polarizing film", this means a "linearly polarizing film"). The optically compensatory sheet may serve also as the protective film of the linearly polarizing film.

The linearly polarizing film is preferably a coating-type polarizing film as represented by those produced by Optiva Inc., or a polarizing film comprising a binder and iodine or a dichroic dye. The iodine or dichroic dye in the linearly polarizing film is caused to align in the binder and thereby expresses the polarizing performance. The iodine or dichroic dye is preferably caused to align along the binder molecule or the dichroic dye is preferably caused to align in one direction by undergoing self-organization like a liquid crystal. At present, the commercially available polarizer is generally produced by dipping a stretched polymer in a bath containing a solution of iodine or dichroic dye, and allowing the iodine or dichroic dye to penetrate into the binder.

In the commercially available polarizing film, iodine or dichroic dye is distributed in the region of about 4 μm from the polymer surface (about 8 μm in total of both sides) and for obtaining a satisfactory polarizing performance, a thickness of at least 10 μm is necessary. The degree of penetration can be controlled by the concentration of iodine or dichroic dye solution, the temperature of the bath containing the solution, and the dipping time in the solution. As described above, the lower limit of the binder thickness is preferably 10 μm. As for the upper limit of the thickness, a smaller thickness is more preferred in view of light leakage of the liquid crystal display device. The upper limit is preferably lower than that of the polarizing plate available at present on the market (about 30 μm) and is preferably 25 μm or less, more preferably 20 μm or less. When the thickness is 20 μm or less, no light leakage is observed in a 17-inch liquid crystal display device.

The binder of the polarizing film may be crosslinked. For the crosslinked binder, a self-crosslinkable polymer may be used. A polymer having a functional group or a binder obtained by introducing a functional group into a polymer is exposed to light or heat or changed in the pH to cause a reaction between binders, whereby a polarizing film can be formed. Also, a crosslinked structure may be introduced into the polymer by a crosslinking agent. The crosslinking is generally performed by applying a coating solution containing a polymer or a mixture of a polymer and a crosslinking agent onto a transparent support and then heating it. It may suffice if durability can be ensured at the stage of a final commercial product, and therefore, the treatment for crosslinking may be performed at any stage until a final polarizing plate is obtained.

The binder of the polarizing film may be either a self-crosslinkable polymer or a polymer which is crosslinked by a crosslinking agent. Examples of the polymer are the same as those described above regarding the polymer for the oriented film. A polyvinyl alcohol and a modified polyvinyl alcohol are most preferred. The modified polyvinyl alcohol is described in JP-A-8-338913, JP-A-9-152509 and JP-A-9-316127. The polyvinyl alcohol and modified polyvinyl alcohol each may be used in combination of two or more thereof.

The amount added of the crosslinking agent for the binder is preferably from 0.1 to 20 mass % based on the binder. Within this range, the orientation property of the polarizing element and the humidity/heat resistance of the polarizing film are enhanced.

Even after the completion of crosslinking reaction, the oriented film somewhat contains an unreacted crosslinking agent. The amount of the crosslinking agent remaining in the oriented film is preferably 1.0 mass % or less, more preferably 0.5 mass % or less. Within this range, decrease in the polarization degree does not occur even when the polarizing film is incorporated into a liquid crystal display device and used for a long time or is left standing in a high-temperature high-humidity atmosphere for a long time. The crosslinking agent is described in U.S. Pat. No. RE23297. A boron compound (e.g., boric acid, borax) may also be used as the crosslinking agent.

As for the dichroic dye, an azo-based dye, a stilbene-based dye, a pyrazolone-based dye, a triphenylmethane-based dye, a quinoline-based dye, an oxazine-based dye, a thiazine-based dye or an anthraquinone-based dye is used. The dichroic dye is preferably water-soluble. Also, the dichroic dye preferably has a hydrophilic substituent (e.g., sulfo, amino, hydroxyl).

Examples of the dichroic dye include the compounds described in JIII Journal of Technical Disclosure, No. 2001-1745, page 58.

In order to increase the contrast ratio of a liquid crystal display device, the transmittance of the polarizing plate is preferably higher and the polarization degree is also preferably higher. The transmittance of the polarizing plate is preferably from 30 to 50%, more preferably from 35 to 50%, and most preferably from 40 to 50%, for light at a wavelength of 550 nm. The polarization degree is preferably from 90 to 100%, more preferably from 95 to 100%, and most preferably from 99 to 100%, for light at a wavelength of 550nm.

<Production of Elliptically Polarizing Plate>

In the case of a stretching method, the stretch ratio is preferably from 2.5 to 30.0 times, more preferably from 3.0 to 10.0 times. The stretching may be performed by dry stretching in air. Wet stretching in the state of being dipped in water may also be performed. The stretch ratio in the dry stretching is preferably from 2.5 to 5.0 times, and the stretch ratio in the wet stretching is preferably from 3.0 to 10.0 times. The stretching step may be performed in several batches including oblique stretching. When stretching is performed in several batches, this enables more uniform stretching even at a high stretch ratio. Before oblique stretching, slight stretching (to an extent of preventing the shrinkage in the width direction) in the transverse or longitudinal direction may be performed. The stretching can be effected by performing the tenter stretching employed in the biaxial stretching, through different steps for right and left directions. The biaxial stretching is the same as the stretching method employed in the normal film formation. In the biaxial stretching, the film is stretched at a different speed between the right side and the left side and therefore, the thickness of the binder film before stretching must be made to differ between the right side and the left side. In the casting film formation, the flow rate of the binder solution can made to differ between the right side and the left side by tapering the die.

In the rubbing method, a rubbing treatment method widely employed as a process of liquid crystal alignment treatment for LCD may be applied. More specifically, the orientation is obtained by rubbing the surface of the film with paper, gauze, felt, rubber, or nylon or polyester fiber in a fixed direction. In general, the rubbing is performed several times by using a cloth in which fibers uniform in the length and thickness are averagely implanted. The rubbing is preferably performed using a rubbing roll where the circularity, cylindricality and deflection (decentering) of the roll itself all are 30 μm or less. The wrap angle of the film to the rubbing roll is preferably from 0.1 to 90°. However, as disclosed in JP-A-8-160430, a stable rubbing treatment may also be achieved by winding the film at an angle of 360° or more.

In the case of rubbing a lengthy film, the film is preferably conveyed by a conveying device at a speed of 1 to 100 m/min under a fixed tension. The rubbing roll is preferably set rotatably in the horizontal direction with respect to the film-traveling direction, so that an arbitrary rubbing angle can be selected. An appropriate rubbing angle is preferably selected in the range from 0 to 60°.

On the surface opposite the optically anisotropic layer of the linearly polarizing film, a surface film is preferably disposed (arrangement of optically anisotropic layer/polarizing film/polymer film). The surface film is also preferably a film having provided on the outermost surface thereof an antireflection film having antifouling property and scratch resistance. As for the antireflection film, any conventionally known antireflection film may be used.

Furthermore, when the surface film is endowed with scattering property, the in-plane uniformity on the display screen may be enhanced, the viewing angle may be enlarged, or the disturbing reflection on the screen surface may be prevented. In particular, when the light-condensing film (VA18) of the backlight has a periodic structure such as prism shape, there is generated moire (fringe-like or concentric) display unevenness due to optical interference with the periodicity of display pixels. The scattering film weakens the shading of light due to the periodic structure, whereby the display unevenness can be eliminated.

The light-scattering film of the present invention is a light-scattering film comprising a transparent support having thereon at least a light-scattering layer, wherein assuming that when nearly parallel light rays are made incident on a surface of the film at an incident angle of 5°, the reflectance for an angle $\theta$ in the light-receiving part measured in a plane containing the film normal line and the incident direction is $R(\theta)$ and the value obtained by normalizing $R(\theta)$ by the reflectance of regular reflection is $Rrel(\theta)$ and further that the value calculated from the maximum variation $|dRrel(\theta)/d\theta|max$ for the angle $\theta$ is a scattering coefficient A (formula 1), the reflection coefficient B (formula 2) calculated from the scattering coefficient A and the 5° specular reflectance Rs is from 1.5 to 4.5. Furthermore, the scattering coefficient A (formula 1) is from 1.5 to 4.5.

Scattering coefficient $A=1/|dRrel(\theta)/d\theta|max$ (Formula 1)

Reflection coefficient $B=2.2\times\log 10(Rs)-7.5\times\log 10(A)+5.9$ (Formula 2)

In regard to the specific means for achieving the light-scattering film satisfying the above-described relationships, for example, a layer having on the surface thereof an irregularity shape formed by dispersing a light-transparent particle in a binder enables realizing such a light-scattering film. Examples of the light-transparent particle include a spherical particle comprising an inorganic substance or a resin, and an amorphous inorganic particle. As for the binder, a polymer resin may be used, or a monomer resin may be cured under light or heat. The surface irregularity shape can be made to have desired scattering properties, for example, by appropriately adjusting the amount ratio of particles in the binder, the layer thickness, the viscosity or surface tension of the binder, or the dispersed state of particles. Also, the reflection properties can be controlled by adjusting the refractive index on the surface or further providing an optical interference layer on the surface. These means are described in detail below, but the present invention is not limited thereto.

The light-scattering film of the present invention has at least a light-scattering layer on a transparent support. The light-scattering layer is sufficient if it has a function of scattering light, and may have other functions, but in a preferred embodiment, the light-scattering film has an internal scattering property and/or a surface scattering property and preferably has both an antiglare property attributable to the surface scattering property and a hardcoat property. Also, the light-scattering film of the present invention is preferably an antireflection film having, in addition to the light-scattering layer, an antireflection layer capable of decreasing the reflectance by using the principle of optical interference. In the following, unless otherwise indicated, the light-scattering film includes an antireflection film having the above-described construction.

The light-scattering layer preferably comprises a light-transparent resin and a light-transparent particle dispersed in the light-transparent resin. The refractive indexes of respective layers constituting the light-scattering film of the present invention preferably satisfy the following relationship:

refractive index of light-scattering layer>refractive index of transparent support>refractive index of low refractive index layer.

In the present invention, the light-scattering layer has an internal scattering property and/or a surface scattering property, preferably has both an antiglare property ascribable to the surface scattering and a hardcoat property. The light-scattering layer is preferably formed in one layer in view of cost and simplification of the process but may be composed of a plurality of layers, for example, from two to four layers. In order to reduce the light brownish looking due to surface irregularities, an overcoat layer is preferably provided on the light-scattering layer having surface irregularities (a layer containing a light-transparent particle). Also, for the antistatic purpose, a transparent electrically conductive layer is preferably provided between the light-scattering layer and the transparent support or between the light-scattering layer and the low refractive index layer, more preferably between the light-scattering layer and the transparent support. It is still more preferred to have a transparent electrically conductive layer between the light-scattering layer and the transparent support and at the same time, has an electrically conductive particle in the light-scattering layer. Between the light-scattering layer and the transparent support, a functional layer such as moisture-preventing layer may be provided other than the transparent electrically conductive layer.

The light-scattering film of the present invention has a high effect of reducing the disturbing reflection. The disturbing reflection is affected by two optical properties of antiglare property and antireflection property, but these properties each is specified by an independent range and does not give a satisfactory indication. In the present invention, it has been found that the contour visibility level of an image entered by disturbing reflection is determined by the size of characteristic functions based on the antiglare property and antireflection property. That is, the present inventors have found that the scattering coefficient A (formula 1) indicative of a surface scattering property related to the antiglare property and the reflection coefficient B (formula 2) calculated from the 5° specular reflectance Rs are preferably set to specific ranges.

(Scattering Coefficient A)

Assuming that when nearly parallel light rays are made to be incident at an incident angle of 5° on a surface of a light-scattering film having at least a light-scattering layer on a transparent support, the reflectance for an angle $\theta$ in the light-receiving part measured in a plane containing the film normal line and the incident direction is $R(\theta)$ and the value obtained by normalizing $R(\theta)$ by the reflectance of regular reflection is $Rrel(\theta)$, the scattering coefficient A is calculated as a scattering coefficient A (formula 1) from the value obtained according to the maximum variation $|dRrel(\theta)/d\theta|max$ for the angle $\theta$. When the blur degree of a reflected image entering the film surface is small, the maximum variation $|dRrel(\theta)/d\theta|max$ for the angle $\theta$ becomes large, and conversely, when the blur degree is large, the maximum variation becomes small. The scattering property can be expressed by a reciprocal of the blur degree, and the scattering coefficient A is calculated according to formula 1. Incidentally, $\theta$ is measured in the range from 0 to 45°.

Scattering coefficient $A=1/|dRrel(\theta)/d\theta|max$ (Formula 1)

The term "nearly parallel light rays" means light rays progressing in parallel within the range of ±3°.

The scattering coefficient A is one parameter indicative of the scattering degree of light incident on the film surface and provides an indication for the blur degree of the contour of a transmitted image or reflected image attributable to surface scattering of the film. That is, this is a parameter exactly indicating the blur degree of the contour of a transmitted image, which is a factor of the reduction of moire, and the blur degree of the contour of a reflected image, which is a factor of the reduction of disturbing reflection. Furthermore, the scattering coefficient A is related to the light brownish looking of the film surface and is a parameter having an effect also on the enhancement of bright-room contrast.

(Reflection Coefficient B)

The reflection coefficient B is calculated using (formula 2) from the scattering coefficient A determined by (formula 1) and the 5° specular reflectance Rs:

$$\text{Reflection coefficient } B = 2.2 \times \log 10(Rs) - 7.5 \times \log 10(A) + 5.9 \quad \text{(Formula 2)}$$

The reflection coefficient B is a parameter indicative of the strength of disturbing reflection. The strength of disturbing reflection indicates the level at which a viewer (a person watching an image display device) recognizes the reflected image entering by disturbing reflection the surface of a film provided on the image display device surface. The reflected image becomes less recognizable as its contour is more blurred and/or the reflected light intensity is smaller. It has been found that the contribution degree of contour blur and reflected light intensity varies depending on the screen size, viewing distance (distance from the screen to the viewer) and the like.

Figure 3:
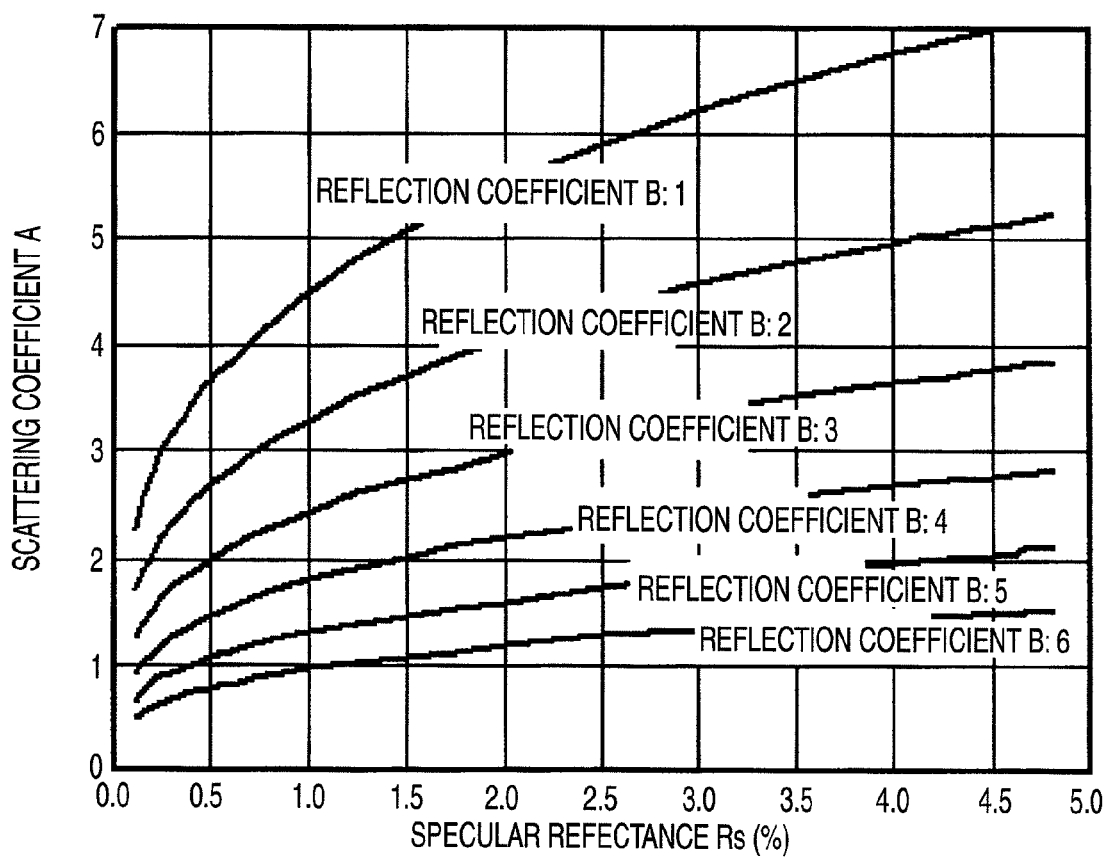
FIG. 3 represents a view showing the relationship of the reflection coefficient B with the scattering coefficient A and 5° specular reflectance Rs.

The formula for calculating the reflection coefficient B can be obtained by preparing samples differing in the scattering coefficient A and 5° specular reflectance Rs and evaluating the disturbing reflection strength by the size (a large screen of 20 inches or more, preferably 32 inches or more) and the viewing distance (2 m or more) suitable for an image display device having a large screen. FIG. 3 shows the relationship of the reflection coefficient B with the scattering coefficient A and 5° specular reflectance Rs. The reflection coefficient B is a sensory evaluation value and therefore, correlates to logarithms of the scattering coefficient A and 5° specular reflectance Rs which are a stimulus value, according to the Weber-Fechner law specifying that "the human sensory amount is proportional to the logarithm of stimulus intensity". Furthermore, the reflection coefficient B is related also to the light brownish looking of the film surface and is a parameter having an effect also on the enhancement of bright-room contrast.

In the present invention, the reflection coefficient B is preferably from 1.5 to 4.5, more preferably from 2.0 to 3.5, and still more preferably from 2.0 to 3.0. If the reflection coefficient exceeds 4.5, the effect of reducing moire and disturbing reflection is not sufficiently high, whereas if it is less than 2.0, this tends to incur worsening of the bright-room contrast and reduction in the brightness.

In order to prevent worsening of the bright-room contrast due to surface scattering, in addition to the reflection coefficient B, the scattering coefficient A is also preferably set to a specific range. The scattering coefficient A is preferably from 1.5 to 4.5, more preferably from 2.0 to 4.0, and still more preferably from 3.0 to 4.0. If the scattering coefficient is excessively large, the bright-room contrast is worsened and the brightness is reduced, whereas if it is too small, the effect of preventing moire and disturbing reflection tends to decrease.

In order to sufficiently reduce the disturbing reflection, the 5° specular reflectance Rs is also preferably set to a specific range. The 5° specular reflectance Rs is preferably from 0.1 to 2.0%, more preferably from 0.1 to 1.5%, still more preferably from 0.1 to 1.2%, yet still more preferably from 0.1 to 1.0%, and most preferably from 0.1 to 0.8%. If the 5° specular reflectance Rs is excessively high, the disturbing reflection is worsened.

In order to provide a surface film optimal for an image display device having a large screen, the bright-room contrast is preferably enhanced. For enhancing the bright-room contrast, the integrated reflectance is preferably from 0.2 to 2.0%, more preferably from 0.2 to 1.8%, still more preferably from 0.2 to 1.5%, and most preferably from 0.2 to 1.3%. If the integrated reflectance is excessively high, the disturbing reflection and bright-room contrast are worsened. Particularly, in the case where a whitish thing casts a disturbing reflection from the regular reflection position of a person watching the display, the bright-room contrast is significantly worsened.

In order to enhance the bright-room contrast, in addition to the integrated reflectance, the difference between the integrated reflectance and the 5° specular reflectance Rs is preferably set to a specific range. The difference between the integrated reflectance and the 5° specular reflectance Rs is preferably from 0.1 to 1.0%, more preferably from 0.15 to 0.8%, still more preferably from 0.2 to 0.6%. If the difference between the integrated reflectance and the 5° specular reflectance Rs is excessively large, the contrast is worsened. Particularly, in the case where a blackish thing casts a disturbing reflection from the regular reflection position of a person watching the display, the bright-room contrast is significantly worsened. Also, if the difference between the integrated reflectance and the 5° specular reflectance Rs is too small, insufficient surface scattering results and in turn, the effect of reducing the disturbing reflection becomes insufficient.

In the present invention, the bright-room contrast is preferably enhanced irrespective of the display-viewing environment. For this purpose, the above-described preferred ranges of the integrated reflectance and the difference between the integrated reflectance and the 5° specular reflectance Rs are preferably satisfied at the same time. It is ideal to satisfy the reflection coefficient B, the scattering coefficient A and the 5° specular reflectance Rs all at the same time. In this case, both the effect of reducing the disturbing reflection and the enhancement of bright-room contract are achieved and a surface film optimal for an image display device having a large screen can be provided.

In order to provide a surface film optimal for an image display device having a large screen, the neutrality of the color tint of reflected light is also preferably set to a specific range. The a*b* values in the CIE1976 L*a*b* color space of regularly reflected light for 5° incident light of a CIE standard illuminant D65 in the wavelength region of 380 to 780 nm are preferably $-7 \leq a^* \leq 7$ and $-10 \leq b^* \leq 10$, more preferably $-5 \leq a^* \leq 5$ and $-7 \leq b^* \leq 7$, still more preferably $0 \leq a^* \leq 5$ and $-7 \leq b^* \leq 0$, respectively. By setting a* and b* to preferred ranges, when outside light casts a disturbing reflection, the reflection tint becomes neutral and does not annoy the viewer. Most preferably, various reflection performances described above as well as the a* and b* values all are set to preferred ranges.

In order to realize such reflection performance and color tint, the refractive index (na) of the light-scattering layer and the refractive index (nb) of the low refractive index layer are preferably set to preferred ranges. The difference na−nb between the refractive index (na) of the light-scattering layer and the refractive index (nb) of the low refractive index layer is 0.04 or more, preferably from 0.08 to 0.35, more preferably from 0.10 to 0.30. When the difference of refractive index is in this range, the reflectance can be sufficiently reduced, the disturbing reflection of the reflected image on the surface can be satisfactorily prevented, the film strength is increased, and the color tint can be prevented from being intensified.

The refractive index (na) of the light-scattering layer is preferably from 1.48 to 1.70, more preferably from 1.50 to 1.60, still more preferably from 1.50 to 1.55. If the refractive index of the light-scattering layer is too small, the difference in the refractive index from the low refractive index layer becomes small and the antireflection property decreases, whereas if the refractive index is excessively high, the usable material is limited and this disadvantageously incurs a cost rise or an intensified color tint. Incidentally, in the present invention, the refractive index of the light-scattering layer is a value determined from the refractive index of a coating film containing solid materials excluding the light-transparent particle.

The refractive index (nb) of the low refractive index layer is preferably from 1.20 to 1.46, more preferably from 1.20 to 1.40, still more preferably from 1.30 to 1.38. If the refractive index of the low refractive index layer is excessively high, the reflectance becomes high and it is disadvantageously required for reducing the reflectance to, for example, elevate the refractive index of the light-scattering layer, whereas if the refractive index is too low, this is not preferred in that the strength of the low refractive index decreases and the usable material is limited to incur a cost rise.

Furthermore, in view of reducing the reflectance, the low refractive index layer preferably satisfies the following mathematical formula (I):

$$(m\lambda/4) \times 0.7 < n1 \times d1 < (m\lambda/4) \times 1.3 \quad \text{Mathematical Formula (I):}$$

In mathematical formula (I), m is a positive odd number, n1 is the refractive index of the low refractive index layer, d1 is the film thickness (nm) of the low refractive index layer, and λ is the wavelength and is a value in the range from 500 to 550 nm. When mathematical formula (I) is satisfied, this means that m (a positive odd number; usually 1) satisfying mathematical formula (I) is present in the above-described wavelength range.

The refractive index of the light-scattering layer and the refractive index of the low refractive index layer are preferably controlled to specific ranges at the same time. An embodiment where the refractive index of the light-scattering layer is from 1.50 to 1.60 and the refractive index of the low refractive index layer is from 1.20 to 1.40 is preferred, an embodiment where the refractive index of the light-scattering layer is from 1.50 to 1.55 and the refractive index of the low refractive index layer is from 1.20 to 1.40 is more preferred, an embodiment where the refractive index of the light-scattering layer is from 1.50 to 1.55 and the refractive index of the low refractive index layer is from 1.30 to 1.38 is still more preferred.

The light-scattering film of the present invention may have a construction where a layer (high refractive index layer) having a refractive index layer higher than that of the light-scattering layer and a low refractive index layer are stacked, or may have a construction where a layer (medium refractive index layer) having a refractive index between the light-scattering layer and the high refractive index layer, a high refractive index layer and a low refractive index layer are stacked.

The medium refractive index layer, high refractive index layer and low refractive index layer each preferably has a film thickness of 200 nm or less. As regards the film thickness and refractive index of each of the medium refractive index layer, high refractive index layer and low refractive index layer, the layer construction described, for example, JP-A-2003-121606 may be used. However, in view of cost, unevenness, productivity and the like, the reflection performance is preferably controlled by not providing a medium refractive index layer or a high refractive index layer between the light-scattering layer and the low refractive index layer and setting the low refractive index layer to the above-described range.

In order to realize the above-described reflection performance and color tint, the surface irregularities of the light-scattering film are preferably controlled to a specific range. As for the surface irregularity shape of the light-scattering film of the present invention, the centerline average roughness Ra is from 0.05 to 0.40 μm, preferably from 0.08 to 0.35 μm, more preferably from 0.10 to 0.30 μm. When the light-scattering film is used in the outermost surface of the display surface, if Ra is excessively large, the bright-room contrast is worsened, whereas if Ra is too small, the disturbing reflection is worsened. The ten-point average roughness Rz is 10 times or less of Ra, and the average peak-to-trough distance Sm is preferably from 30 to 200 μm, more preferably from 50 to 180 μm, still more preferably from 50 to 150 μm. The surface irregularities are preferably designed such that the standard deviation of the protrusion height from the deepest part of irregularities becomes 0.5 μm or less and the surface at a tilt angle of 0 to 5° occupies 10% or more.

In order to enhance the bright-room contrast, it is also preferred to control the average tilt angle. The average tilt angle is preferably from 0.1 to 4.0°, more preferably from 0.2 to 3.0°. If the average tilt angle is large, the bright-room contrast is worsened, whereas if it is small, the disturbing reflection is worsened. For making both properties good, in addition to the average tilt angle, the Sm value preferably satisfies the above-described range and it is more preferred to satisfy that the average tilt angle is from 0.2 to 1.2° and at the same time, the Sm value is from 50 to 120 μm.

In order to provide a surface film having good bright-room contrast and good effect of reducing disturbing reflection, which is optimal for an image display device having a large screen, the reflection performance and color tine need to be optimally designed. For this purpose, it is most preferred that the refractive index of the light-scattering layer, the refractive index of the low refractive index and the surface irregularities all are set to specific ranges. More specifically, it is most preferred to satisfy all the conditions that the refractive index of the light-scattering layer is from 1.50 to 1.55, the refractive index of the low refractive index is from 1.30 to 1.38 and Ra is from 0.10 to 0.30 μm. More preferably, Sm and the average tilt angle are set to the above-described ranges at the same time.

In the light-scattering film of the present invention, the haze ascribable to surface scattering (hereinafter referred to as a "surface haze") is preferably from 0.3 to 20%, more preferably from 0.5 to 10%, still more preferably from 0.5 to 5%, yet still more preferably from 0.5 to 2%. If the surface haze is excessively large, the bright-room contrast is worsened, whereas if too small, the disturbing reflection is worsened.

The light-scattering film of the present invention preferably has an optical property that the haze ascribable to internal scattering (hereinafter referred to as an "internal haze") is from 0 to 60%, more preferably from 1 to 40%, still more preferably from 5 to 35%, yet still more preferably from 7 to 30%. If the internal haze is excessively large, the front contrast decreases and light brownish looking is intensified, whereas if it is too small, the combination of usable materials is limited, making it difficult to combine the antiglare property and other characteristic values, and the cost also rises.

The surface haze and internal haze can be measured according to the following procedure.

(1) The entire haze value (H) of the film is measured according to JIS-K7136.

(2) After adding several silicone oil drops on the low refractive index layer-side surface and back surface of the film, the film is sandwiched from front and back by two 1 mm-thick glass plates (Microslide Glass No. S 9111, produced by Matsunami K. K.) and put into optically complete contact with two glass plates to provide a surface haze-removed state, and the haze is measured. From this value, the haze separately measured by interposing only the silicone oil between two glass plates is subtracted, and the value obtained is calculated as the internal haze (Hi).

(3) The internal haze (Hi) calculated in (2) above is subtracted from the entire haze (H) measured in (1) above, and the value obtained is calculated as the surface haze (Hs) of the film.

In the light-scattering film of the present invention, the image sharpness according to JIS K7105 is, as measured with an optical comb width of 0.5 mm, preferably from 5 to 80%, more preferably from 10 to 60%, still more preferably from 15 to 55%. If the image sharpness is low, bad bright-room contrast results, whereas if it is high, the disturbing reflection is worsened.

[Light-Scattering Layer]

The light-scattering layer is formed for the purpose of endowing the film with an antiglare property by surface scattering, an internal scattering property and preferably a hardcoat property for enhancing the scratch resistance of the film. Accordingly, the light-scattering layer preferably contains a light-transparent resin capable of imparting the hardcoat property and a light-transparent particle for imparting the antiglare property and internal scattering property.

(Light-Transparent Particle)

The average particle diameter of the light-transparent particle is preferably from 0.5 to 10 μm, more preferably from 3 to 10 μm, still more preferably from 5 to 10 μm, yet still more preferably from 6 to 8 μm. If the average particle diameter is small, the average tilt angle on the surface becomes large and the bright-room contrast tends to be worsened. Also, scattering in the high-angle direction ascribable to internal scattering of light is increased and this is not preferred in that, for example, the dark-room contrast is worsened or the display causes character blur. On the other hand, if the particle diameter is excessively large, the film thickness increases for obtaining a preferred surface form and the curling is worsened. Also, this is not preferred in that, for example, the material cost rises.

Specific preferred examples of the light-transparent particle include a resin particle such as poly((meth)acrylate) particle, crosslinked poly((meth)acrylate) particle, polystyrene particle, crosslinked polystyrene particle, crosslinked poly(acryl-styrene) particle, melamine resin particle and benzoguanamine resin particle. Among these, a crosslinked resin particle such as crosslinked polystyrene particle, crosslinked poly((meth)acrylate) particle and crosslinked poly(acryl-styrene) particle is more preferred, and a crosslinked poly ((meth)acrylate) particle is still more preferred. The refractive index of the light-transparent resin is adjusted in accordance with not only the size and kind of the particle but also the refractive index of each light-transparent particle selected from the particles above, whereby the internal haze and surface haze of the present invention as well as the centerline average roughness can be achieved. More specifically, a combination of a light-transparent resin (refractive index after curing: from 1.50 to 1.53) mainly comprising a trifunctional or greater (meth)acrylate monomer which is preferably used in the light-scattering layer of the present invention as described later, with a light-transparent particle comprising a crosslinked poly(meth)acrylate-based polymer having an acryl content of 50 to 100 mass % is preferred, and a combination with a crosslinked poly((meth)acrylate) particle is more preferred. As for the light-transparent particle, an inorganic particle such as aggregating silica described later may also be used.

In the present invention, the difference of the refractive index between the light-transparent resin and the light-transparent particle (refractive index of light-transparent particle—refractive index of light-transparent resin) is preferably, in terms of the absolute value, from 0.001 to 0.100, more preferably from 0.001 to 0.050, still more preferably from 0.001 to 0.040, yet still more preferably from 0.001 to 0.030, and most preferably from 0.001 to 0.025. Within this range, problems such as film character burring, reduction in the dark-room contrast, and surface clouding, can hardly occur. It is particularly preferred to use a light-transparent particle comprising a crosslinked poly(meth)acrylate-based polymer and having an average particle diameter of 6 to 8 μm and adjust the difference of refractive index between the light-transparent resin and the light-transparent particle to fall in the range from 0.01 to 0.025.

Here, the refractive index of the light-transparent resin can be quantitatively evaluated, for example, by the direct measurement using an Abbe refractometer or by the measurement using a spectral reflection spectrum or spectral ellipsometry. The refractive index of the light-transparent particle is determined in such a way that the light-transparent particle is dispersed in an equal amount in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

In the present invention, two or more different kinds of particles may be used in combination. The film may be designed by utilizing the characteristic features of a plurality of particles, for example, surface irregularities are formed by the light-transparent particle having a larger particle diameter to impart an antiglare property and the roughened texture on the surface is reduced by the light-transparent particle having a smaller particle diameter; surface irregularities are formed by the light-transparent particle having a larger particle diameter to impart an antiglare property and mainly an internal scattering property is imparted by the light-transparent particle having a smaller particle diameter; or the scattering angle distribution of internal scattering is adjusted by two kinds of particles. In the case of using two or more different kinds of particles, it is preferred to use the above-described particle for one of those particles.

The light-transparent particle is preferably blended to account for 5 to 40 mass %, more preferably from 5 to 25 mass %, still more preferably from 7 to 20 mass %, in the entire solid content of the light-scattering layer. If the content is less than 5 mass %, the addition effect is insufficient, whereas if it exceeds 40 mass %, problems such as image blurring or surface clouding or glittering are liable to occur.

The coated amount of the light-transparent particle is preferably from 30 to 2,500 mg/m$^2$, more preferably from 100 to 2,400 mg/m$^2$, still more preferably from 600 to 2,300 mg/m$^2$, yet still more preferably from 1,000 to 2,000 mg/m$^2$.

The average film thickness of the light-scattering layer is preferably from 2 to 30 µm, more preferably from 7.5 to 30 µm, still more preferably from 8 to 20 µm, yet still more preferably from 10 to 16 µm. If the thickness is too small, the hardcoat property is insufficient, whereas if it is too large, the curling or brittleness is worsened and the processing suitability may decrease. Therefore, the film thickness is preferably in the above-described range. The average film thickness of the diffusing layer is determined by enlarging the cross-sectional surface at a magnification of 5,000 times by an electron microscope, copying down the light-scattering layer by tracing paper (Se-TD 58, 50 g/m$^2$) produced by Kokuyo Co., Ltd., and measuring the mass.

The average film thickness of the light-scattering layer is from 1.4 to 3.5 times, preferably from 1.5 to 3.0 times, more preferably from 1.5 to 2.5 times, still more preferably from 1.6 to 2.0 times, the average particle diameter of the light-transparent particle. When the average film thickness of the light-scattering layer is from 1.4 to 3.5 times the average particle diameter of the light-transparent particle, the film thickness dependency or particle diameter dependency of the antiglare property is reduced. Therefore, even when the film thickness is fluctuated due to steaks generated at the coating or drying unevenness, the surface state defect such as streaks or unevenness can be made less recognizable. The antiglare property is preferably provided by surface irregularities resulting from protrusion ascribable to a three-dimensional steric structure which is formed by an aggregate of a plurality of particles, because even when slight change is generated in the film thickness or particle diameter, the size of surface irregularities is scarcely changed and the change of the antiglare property is advantageously small, so that a preferred surface form can be obtained. If the ratio of average film thickness/average particle diameter is too small, since the particle is present in one layer of the film, slight change in the film thickness or particle size causes a great change in the size of surface irregularities and in turn, in the antiglare property. Also, the bright-room contrast is liable to be worsened. On the other hand, if the ratio is excessively large, the aggregate of a plurality of particles is buried in the film, as a result, almost no surface irregularities are formed and the required antiglare property cannot be obtained.

When the ratio of average film thickness/average particle diameter is from 1.4 to 3.5, the average particle diameter less fluctuates among particle lots and the fluctuation of antiglare property of the film is reduced, so that a film with small lot-to-lot fluctuation can be obtained. Also, in view of the disturbing reflection and bright-room contrast, which are intended to improve in the present invention, if the ratio of average film thickness/average particle diameter is too small, bad bright-room contrast results, whereas if it is excessively large, the disturbing reflection is worsened.

In the case of using the light-scattering film of the present invention on the display surface, its pencil hardness is preferably high. The pencil hardness is preferably 2H or more, more preferably from 3H to 7H, still more preferably from 4H to 6H.

The light-scattering film of the present invention has an effect of eliminating moire (fringe-like or concentric) display unevenness due to optical interference between the light-condensing film for enhancing the brightness of the backlight and the display pixel, but the light-scattering film may also be disposed as the surface film (VA17) of the lower polarizing film, that is, on the surface of the protective film of the backlight-side polarizing film, other than on the outermost surface of the display. Furthermore, the light-scattering film may be separately disposed as a light-scattering film between the light-condensing film (VA18) and the lower polarizing plate surface film (VA17). In addition, the light-scattering film may be disposed at any position as long as it is between the glass substrate in a pair (VA5, VA8) sandwiching the liquid crystal layer and the polarizing film (VA1, VA14), and may be used to serve also as an optically anisotropic layer (VA3, VA10, VA12) or an adhesion layer or adhesive layer for adhering each film or further to serve also as a color filter, a black matrix, a planarizing film or an oriented film inside of the glass plate (VA5, VA8).

As for the method of eliminating the moire (fringe-like or concentric) display unevenness due to optical interference between the light-condensing film for enhancing the brightness of the backlight and the display pixel, in addition to use of the light-scattering film, (M1) a method of crossing the linear direction of the light-condensing film with the axis of the pixel pitch direction, (M2) a method of crossing the linear direction of the light-condensing film or the axis of the pixel pitch direction with the absorption axis of the polarizing film, (M3) a method of making the linear pitch of the light-condensing film to be smaller than the pixel pitch, or a combination thereof is effective.

As regards the method of (M1), moire is most likely generated when the axis is in parallel and even in the case of vertical arrangement, moire occurs because the pixel pitch is in a matrix (grid) configuration. Accordingly, the axis (groove direction) of the light-condensing sheet (prism sheet) is preferably crossed with the pixel pitch at an arbitrary angle (for example, 45°) from the vertical or parallel direction. However, in a large display device such as TV, the viewing angle is important and therefore, the prism axis is preferably arranged in the horizontal direction so as to collect light only in the up/down direction. For these reasons, the crossing angle is suitably 2 to 20°, preferably 5 to 10°, from the horizontal direction.

In another method of (M1), the pixel arrangement is changed to a zigzag configuration from the matrix (grid) configuration. It is preferred that the axis (groove direction) of the light-condensing sheet is in the horizontal direction and the angle of pixel wiring is from 3 to 60°. The crossing angle of pixel wirings does not affect the viewing angle and therefore, is preferably 45°.

In the method of (M2), the absorption axis of the polarizing plate is crossed with the pixel matrix (grid). Usually, the crossing angle between the absorption axis of the polarizing plate and the pixel matrix is horizontal or vertical, but when the crossing angle is made to be 2 to 20°, preferably 5 to 10°, from the horizontal direction, moire unevenness can be reduced. At this time, the absorption axes (VA2, VA15) of the upper and lower polarizing films (VA1, VA14) are preferably arranged to cross at right angles.

As for the method of (M3), assuming that the frequency of the light-condensing film pitch is F1 and the frequency of the display pixel pitch (in the vertical or transverse direction) is F2, when F1-F2 is natural number-fold (1, 2, 3, 4, n), moire display unevenness is likely generated. The pitches are adjusted not to fall in this relationship and the light-condensing film pitch is made small, whereby moire can become hardly generated.

In the light-condensing sheet, the cross-sectional configuration in the direction perpendicular to the groove may be in a lens shape (lenticular lens), a zigzag shape or any other shape. A shape ensuring that the desired light-condensing effect is obtained and the moire display unevenness is eliminated by using the above-described method can be selected from various shapes.

EXAMPLES

The present invention is described in greater detail below by referring to Examples. The materials, reagents, amounts and ratios of substances, operations and the like indicated in the following Examples may be appropriately varied or modified without departing from the spirit of the present invention. The scope of the present invention is, therefore, not limited to these specific Examples.

Example 1

(1) Coating of Light-Scattering Layer

A 80 μm-thick triacetyl cellulose film (TAC-TD80U, produced by Fujifilm Corp., refractive index: 1.49) in a roll form was unrolled as the transparent support, and Coating Solution A for Light-Scattering Layer was coated thereon by the die coating method shown in Constitution of Apparatus and Coating Conditions below and after drying at 30° C. for 15 seconds and at 90° C. for 20 seconds, irradiated with an ultraviolet ray at an irradiation dose of 90 mJ/cm$^2$ by using an air-cooled metal halide lamp (manufactured by Eye Graphics Co., Ltd.) of 160 W/cm under nitrogen purging (to an oxygen concentration of 0.05 vol %) to cure the coated layer, whereby a 12 μm-thick light-scattering layer having an antiglare property was formed. The resulting film was taken up.

Figure 6:
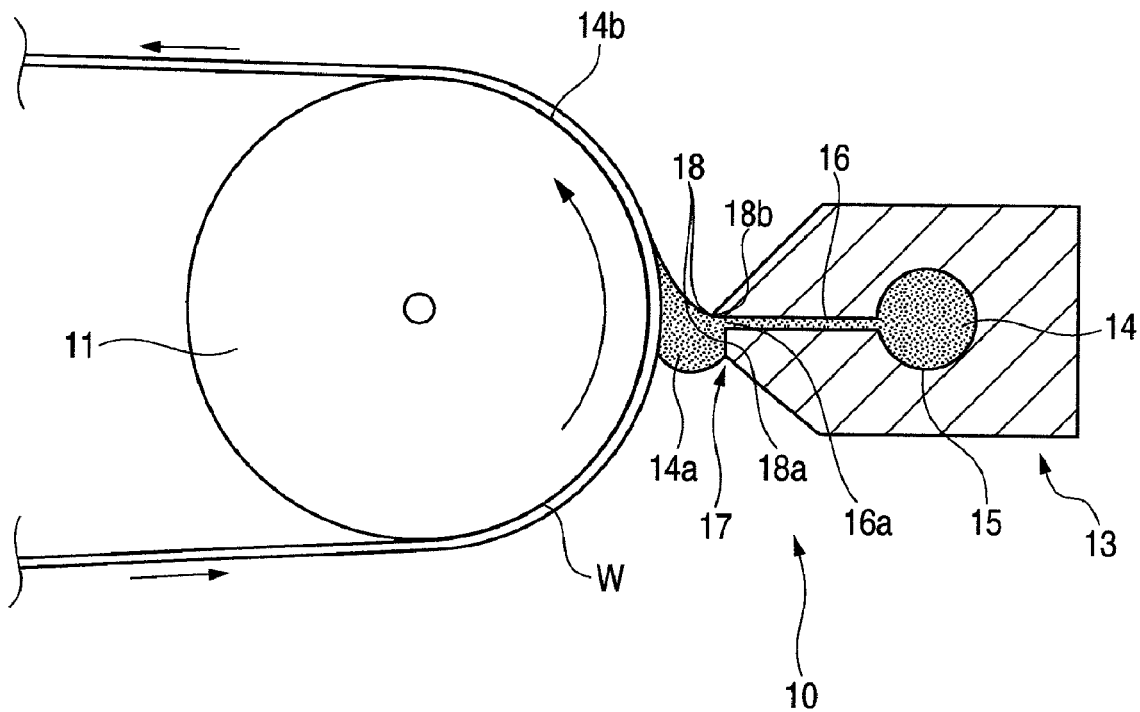
FIG. 6 represents a cross-sectional view of the coater with a slot die for suitable use in the present invention.
Figure 7:
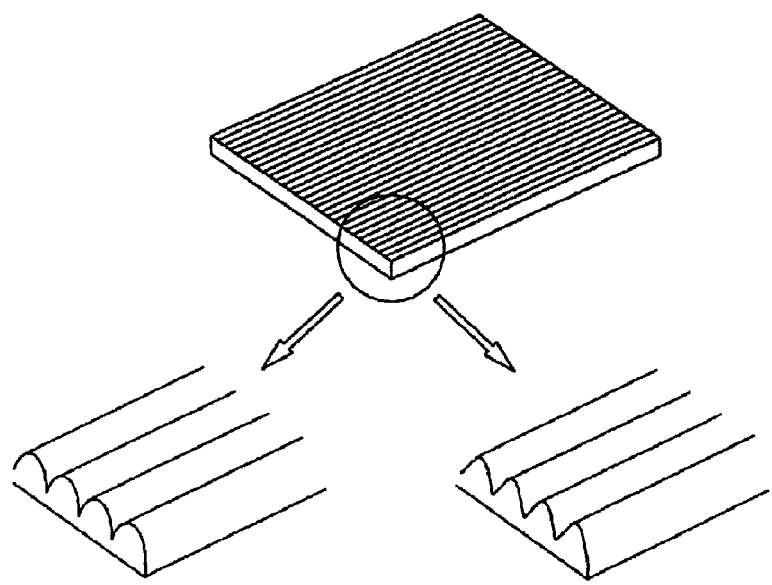
FIG. 7 represents a diagram of the optical member having a light-condensing property which has a linear periodic concave-convex structure for suitable use in the present invention, wherein VA1 denotes upper polarizing plate, VA2 denotes absorption axis of upper polarizing plate, VA3 denotes upper optically anisotropic layer, VA4 denotes slow axis direction of upper optically anisotropic layer, VA5 denotes upper electrode substrate of liquid crystal cell, VA6 denotes alignment control direction of upper substrate, VA7 denotes liquid crystal layer, VA8 denotes lower electrode substrate of liquid crystal cell, VA9 denotes alignment control direction of lower substrate, VA10 denotes lower optically anisotropic layer 1, VA11 denotes slow axis direction of lower optically anisotropic layer 1, VA12 denotes lower optically anisotropic layer 2, VA13 denotes slow axis direction of lower optically anisotropic layer 2, VA14 denotes lower polarizing plate, VA15 denotes absorption axis of lower polarizing plate, VA16 denotes upper polarizing plate surface film, VA17 denotes lower polarizing plate surface film, VA18 denotes light-condensing optical film, VA19 denotes backlight, VA20 denotes upper polarizing film, VA21 denotes lower polarizing film, P1 denotes prism sheet, P2 denotes diffuser plate, 1 denotes sample film, 2 denotes incident light, 3 denotes detector, 4 denotes incident light-containing plane vertical to sample surface, 10 denotes coater, 11 denotes backup roll, W denotes web, 13 denotes slot die, 14 denotes coating solution, 14a denotes bead, 14b denotes coating film, 15 denotes pocket, 16 denotes slot, 17 denotes end lip, 18 denotes land, 18a denotes upstream lip land and 18b denotes downstream lip land.

Basic Conditions (reference to FIG. 6):

A slot die 13 where the upstream lip land length $I_{UP}$ is 0.5 mm, the downstream lip land length $I_{LO}$ is 50 μm, the length of the opening of the slot 16 in the web running direction is 150 μm and the length of the slot 16 is 50 mm, was used. The gap between the upstream lip land 18a and the web W was set 50 μm longer than the gap between the downstream lip land 18b and the web W (hereinafter referred to as a 50-μm overbite length), and the gap between the downstream lip land 18b and the web W was set to 50 μm. The coating was performed by setting the conditions according to liquid properties of each coating solution, that is, for the light-scattering layer, the coating speed was 20 m/min and the wet coated amount was 17.5 ml/m$^2$ in the case of Coating Solution A for Light-Scattering Layer; the coating speed was 30 m/min and the wet coated amount was 13.8 ml/m$^2$ in the case of Coating Solution B for Light-Scattering Layer; and for the low refractive index layer, the coating speed was 40 m/min and the wet coated amount was 5.0 ml/m$^2$. The coating width was 1,460 mm and the effective width was 1,440 mm.

(2) Coating of Low Refractive Index Layer

The triacetyl cellulose film in which the light-scattering layer was provided by applying Coating Solution A for Light-Scattering Layer, was again unrolled, and Coating Solution A for Low Refractive Index Layer was coated thereon under the above-described basic conditions and after drying at 120° C. for 150 seconds and further at 140° C. for 8 minutes, irradiated with an ultraviolet ray at an irradiation dose of 300 mJ/cm$^2$ by using an air-cooled metal halide lamp of 240 W/cm (manufactured by Eye Graphics Co., Ltd.) under nitrogen purging (to an oxygen concentration of 0.05 vol %), whereby a 95 nm-thick low refractive index layer was formed. The resulting film was taken up.

(3) Saponification Treatment of Light-Scattering Film

After the film-formation of the low refractive index layer, the sample was subjected to the following treatment.

An aqueous 1.5 mol/l sodium hydroxide solution was prepared and kept at a temperature of 55° C. Separately, an aqueous 0.01 mol/l dilute sulfuric acid solution was prepared and kept at a temperature of 35° C. The light-scattering film produced was dipped in the aqueous sodium hydroxide solution for 2 minutes and then dipped in water to thoroughly wash out the aqueous sodium hydroxide solution. Subsequently, the film was dipped in the aqueous dilute sulfuric acid solution for 1 minute and then dipped in water to thoroughly wash out the aqueous dilute sulfuric acid solution. Finally, the sample was thoroughly dried at 120° C. In this way, a saponified light-scattering film was produced. This is designated as Sample 1-1.

(Preparation of Coating Solution A for Light-Scattering Layer)

| | |
|---|---|
| PET-30 | 40.0 g |
| DPHA | 6.0 g |
| IRGACURE 184 | 1.7 g |
| MX-600 (30%) | 21.5 g |
| KBM-5103 | 6.0 g |
| MIBK | 18.0 g |
| MEK | 6.0 g |

(Preparation of Coating Solution B for Light-Scattering Layer)

| | |
|---|---|
| PET-30 | 45.9 g |
| SYLYSIA 445 (30%) | 1.5 g |
| IRGACURE 184 | 1.5 g |
| MIBK | 30.0 g |
| MEK | 10.0 g |

(Preparation of Coating Solution C for Light-Scattering Layer)

| | |
|---|---|
| PET-30 | 42.9 g |
| SYLYSIA 445 (30%) | 4.5 g |
| IRGACURE 184 | 1.5 g |
| MIBK | 30.0 g |
| MEK | 10.0 g |

The compounds used are as follows.

PET-30:
A mixture of pentaerythritol triacrylate and pentaerythritol tetraacrylate [produced by Nippon Kayaku Co., Ltd.].

DPHA:
A mixture of dipentaerythritol pentaacrylate and dipentaerythritol hexaacrylate [refractive index: 1.52, produced by Nippon Kayaku Co., Ltd.]

KBM-5103:
A silane coupling agent [produced by Shin-Etsu Chemical Co., Ltd.]

IRGACURE 184:
A polymerization initiator [produced by Ciba Specialty Chemicals Corp.]

MX-600:
A PMMA particle having an average particle diameter of 6 μm [refractive index: 1.49, produced by Soken Chemical & Engineering Co., Ltd., a 30% MIBK liquid dispersion, used after dispersion in a polytron dispersing machine at 10,000 rpm for 20 minutes]

SYLYSIA 445:

A silica particle having an average particle diameter of 6.2 µm [refractive index: 1.45, produced by Fuji Silysia Chemical Ltd., a 30% MEK liquid dispersion, used after dispersion in a polytron dispersing machine at 10,000 rpm for 20 minutes]

(Preparation of Sol Solution a)

In a reactor equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethyl acetate were added and mixed and after adding 30 parts of ion-exchanged water, the reaction was allowed to proceed at 60° C. for 4 hours. The reaction solution was cooled to room temperature to obtain Sol Solution a. The mass average molecular weight was 1,600 and out of the oligomer or higher components, the proportion of the components having a molecular weight of 1,000 to 20,000 was 100%. Also, the gas chromatography analysis revealed that the raw material acryloyloxypropyltrimethoxysilane was not remaining at all.

(Preparation of Liquid Dispersion)

Acryloyloxypropyltrimethoxysilane (produced by Shin-Etsu Chemical Co., Ltd.) (30 g) and 1.5 g of diisopropoxyaluminum ethyl acetate were added and mixed to 500 g of a hollow silica fine particle sol (isopropyl alcohol silica sol, produced according to Preparation Example 4 of JP-A-2002-79616 by changing the size, average particle diameter: 60 nm, shell thickness: 10 nm, silica concentration: 20 mass %, refractive index of silica particle: 1.31) and after adding thereto 9 g of ion-exchanged water, the reaction was allowed to proceed at 60° C. for 8 hours. The reaction solution was then cooled to room temperature and 1.8 g of acetylacetone was added thereto. While adding cyclohexanone to 500 g of the obtained liquid dispersion to keep nearly constant the silica content, the solvent was displaced by reduced-pressure distillation at a pressure of 20 kPa. No foreign matter was generated in the liquid dispersion and when the solid material concentration was adjusted to 20 mass % with cyclohexanone, the viscosity at 25° C. was 5 mPa·s. The amount of residual isopropyl alcohol in Liquid Dispersion A obtained was analyzed by gas chromatography and found to be 1.5%.

(Preparation of Coating Solution A for Low Refractive Index Layer)

240 Parts by mass (48.0 parts by mass as the solid content of silica+surface treating agent) of the liquid dispersion above and 17.2 parts by mass (5.0 parts by mass as the solid content) of Sol Solution a were added to 783.3 parts by mass (47.0 parts by mass as the solid content) of Opstar JN7228 (a thermally crosslinking fluorine-containing silicone-containing polymer composition (solid content: 6%) produced by JSR Corp.). The resulting solution was diluted with cyclohexane and methyl ethyl ketone such that the solid material concentration of the entire coating solution became 6 mass % and the ratio between cyclohexane and methyl ethyl ketone became 10:90. In this way, Coating Solution A for Low Refractive Index Layer was prepared. The refractive index of the layer formed of this coating solution was 1.365.

(Evaluation of Light-Scattering Film)

The obtained film was evaluated for the following items. The results are shown in Table 2.

(1) Specular Reflectance

The back surface of the a*b* film was roughened with sandpaper and then treated with black ink to provide a state of the reflection on the back surface being eliminated. The specular reflectance on the front surface side for the outgoing angle of −5° at an incident angle of 5° was measured in the wavelength region of 380 to 780 nm by using a spectrophotometer (manufactured by JASCO Corporation), and an average specular reflectance (Rs) at 450 to 650 nm was calculated. Furthermore, the a* value and b* value in the CIE1976 L*a*b* color space indicating the color tint of regularly reflected light for 5° incident light of a CIE standard illuminant D65 was calculated from the measured reflection spectrum, and the color tint of reflected light was evaluated.

(2) Scattering Coefficient A

Figure 4A:
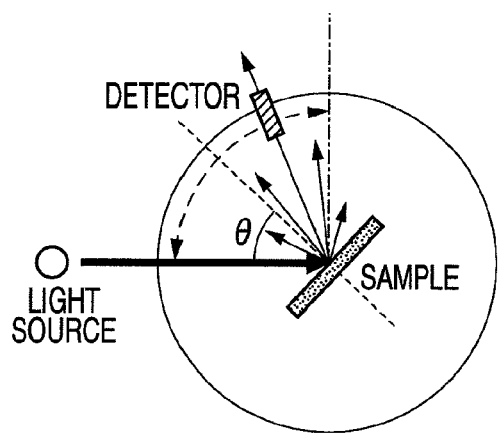
FIGS. 4A and 4B represent views showing one exemplary example of the method for measuring the angle dependency of the reflected light intensity at the calculation of the scattering coefficient A.
Figure 4B:
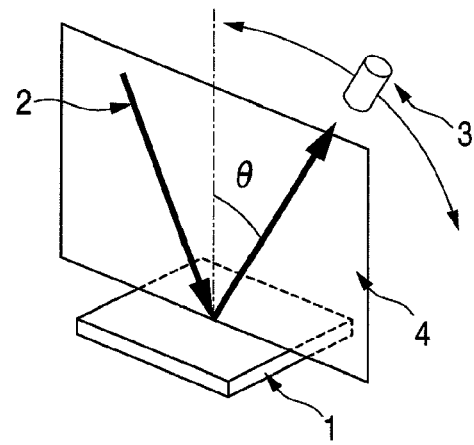

As shown in FIG. 4A, white parallel light rays of about 5 mmφ were made to enter the surface of Light-Scattering Film Sample A at an incident angle of 5° and by continuously varying the angle of the light-receiving part G in 0.1° steps in the plane C containing the incident light direction E and the film normal direction D, the angle dependency of reflected light intensity was measured. The measuring apparatus used was an automatic goniophotometer, "Model GP-5", manufactured by Murakami Color Research Laboratory. FIG. 4B shows a cubic diagram of the measuring method.

In calculating the reflectance the light intensity $I_0$ of the light source when incident light is directly measured without a sample is taken as 100% intensity. Assuming that the reflection intensity at each reflection angle is $I(\theta)$, the reflectance $R(\theta)$ can be calculated by $I(\theta)/I_0$. Furthermore, the relative reflectance $Rrel(\theta)$ is calculated as a ratio of the reflectance at each reflection angle to the reflectance $R(5)$ at a reflection angle (5°) giving regular reflection, that is, $Rrel=R(\theta)/R(5)$. The variation $|dRrel(\theta)/d\theta|$ of the relative reflectance for the reflection angle θ was calculated as an absolute value of the gradient a from the 10-point average values on both sides at points of the data measured in 0.1° steps, and the scattering coefficient A is calculated according to (formula 1) from $|dRrel(\theta)/d\theta|max$ which is the maximum value of $|dRrel(\theta)/d\theta|$. The 10-point average value was used as a processing for removing noises in the data. The θ range measured is from 0 to 45°.

Figure 5:
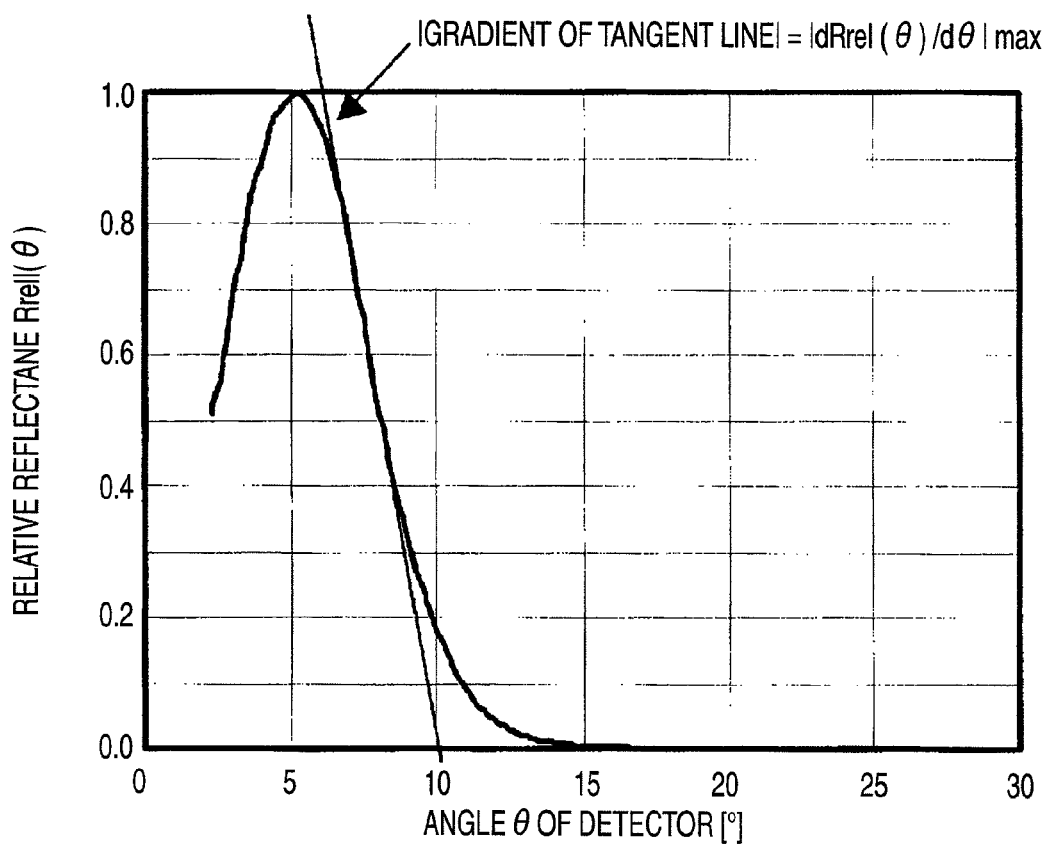
FIG. 5 represents one exemplary example of the graph showing the relative reflectance Rrel(θ) for the angle θ in the light-receiving part (detector), and a schematic view of the calculation of |dRrel(θ)/dθ|max.

FIG. 5 schematically shows the calculation of $|dRrel(\theta)/d\theta|max$. The abscissa indicates the angle θ (unit: degree) of the light-receiving part with respect to the film normal line, and the ordinate indicates the relative reflectance $Rrel(\theta)$ normalized by the peak intensity. The tangent line H is one of tangent lines at respective points in the angle dependency graph of the relative reflectance. The gradient of the tangent line is $|dRrel(\theta)/d\theta|$, and the maximum value thereof is $|dRrel(\theta)/d\theta|max$. The scattering coefficient A was calculated according to (formula 1) from $|dRrel(\theta)/d\theta|$ determined as above.

Scattering coefficient $A=1/|dRrel(\theta)/d\theta|max$ (Formula 1)

(3) Reflection Coefficient B

The reflection coefficient was calculated according to (formula 2) from the specular reflectance Rs and the scattering coefficient A.

Reflection coefficient $B=2.2\times\log 10(Rs)-7.5\times\log 10(A)+5.9$ (Formula 2)

(Modification of Liquid Crystal TV)

A liquid crystal TV (Model LC-32GS10) manufactured by Sharp Corp. was disassembled and the optical sheets present between the backlight and the liquid crystal panel all were removed except for the diffuser plate. Subsequently, Prism Sheet BEF2 produced by 3M Ltd. was disposed instead such that the groove direction became the horizontal direction of the screen, and the TV was reassembled. Furthermore, only the polarizing plate surface films (upper and lower polarizing plates) on the viewing side were carefully separated and Sample 1-1 was laminated instead by a pressure-sensitive adhesive. In a bright room at an illuminance of 600 1×, a board having drawn on the surface thereof white and black stripes at 15 cm width intervals was caused to cast a disturbing reflection on the TV fabricated above from a 2 m distant position, and the level of disturbing reflection was evaluated according to the following criteria.

A: The contour is not recognized at all.
B: The contour is recognized and slightly annoying.
C: The contour is annoying.

The result was "A".

Also, under an environment at an illuminance of 50 1×, in an all-green display state of the liquid crystal TV, the degree to which the partial enlargement/shrinkage of each pixel of B, G and R is non-uniformly viewed (glittering) was evaluated with an eye according to the following criteria.

A: Glittering is not annoying.
B: Glittering is slightly annoying.
C: Glittering is annoying.

The result was "A".

Furthermore, under an environment at an illuminance of 50 1×, in an all-gray display (gradation 126/255) state of the liquid crystal TV, the degree of fringe-like moire display unevenness was evaluated with an eye according to the following criteria.

A: Moire is not annoying.
B: Moire is recognized but not annoying.
C: Moire is slightly annoying.
D: Moire is annoying.

The result was "A".

Comparative Example 1

A liquid crystal display device was produced using the product directly without exchanging the polarizing plate in Example 1. The level of disturbing reflection was "B", the level of glittering was "B", and the level of moire was "D".

Comparative Example 2

The construction was the same as in Example 1 except that in Example 1, Sample 1-1 was not laminated to the surface of the lower polarizing plate. The level of disturbing reflection was "A", the level of glittering was "A", and the level of moire was "C".

Example 2

The construction was the same as in Example 1 except that in Example 1, the surface of the lower polarizing plate was not changed from that of the commercial product and Sample 1-1 was disposed as a light-diffusing film between the light-condensing film (VA18) and the lower polarizing plate surface film (VA17). The level of disturbing reflection was "A", the level of glittering was "A", and the level of moire was "A".

Example 3

The construction was the same as in Example 1 except that in Comparative Example 2, the axis in the groove direction of the prism sheet was arranged to cross at 5° from the horizontal direction. The level of disturbing reflection was "A", the level of glittering was "A", and the level of moire was "B".

Example 4

The construction was the same as in Example 1 except that in Comparative Example 2, upper and lower polarizing plates were once carefully separated and then again laminated by rotating the absorption axis of each polarizing plate at 5° in the clockwise direction. The level of disturbing reflection was "A", the level of glittering was "A", and the level of moire was "B".

Example 5

The construction was the same as in Example 1 except that in Example 1, Sample 1-2 was laminated in place of Sample 1-1 to the lower polarizing plate surface. Sample 1-2 was produced in the same manner as Sample 1-1 of Example 1 except that in the production process, Coating Solution B for Light-Scattering Layer was used in place of Coating Solution A for Light-Scattering Layer and a low refractive index layer was not provided. The level of disturbing reflection was "A", the level of glittering was "A", and the level of moire was "A".

Example 6

The construction was the same as in Example 1 except that in Example 1, Sample 1-2 was laminated in place of Sample 1-1 to the upper and lower polarizing plate surfaces. The level of disturbing reflection was "A", the level of glittering was "A", and the level of moire was "A".

Example 7

Figure 2:
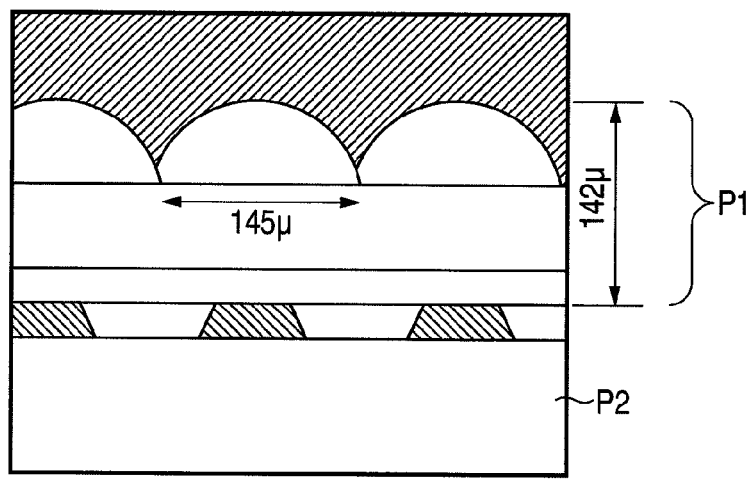
FIG. 2 represents a schematic view showing one exemplary embodiment of the lenticular lens having grooves in the horizontal direction of the screen.

A liquid crystal display device was produced in the same manner as in Example 1 except that a liquid crystal TV, Model LC-37GS10, manufactured by Sharp Corp. was used in place of the modified liquid crystal TV. In this liquid crystal TV, a prism sheet-integrated diffuser plate was used between the backlight and the liquid crystal panel, and a lenticular lens having grooves in the horizontal direction of the screen as shown in FIG. 2 was used for the prism sheet. The level of disturbing reflection was "A", the level of glittering was "A", and the level of moire was "B".

Example 8

The construction was the same as in Example 7 except that in Example 7, Sample 1-2 was laminated in place of Sample 1-1 to the lower polarizing plate surface. The level of disturbing reflection was "A", the level of glittering was "A", and the level of moire was "A".

Comparative Example 3

The construction was the same as in Example 7 except that in Example 7, a TAC (triacetyl cellulose) film not having a light-scattering layer was laminated in place of Sample 1-1 to the upper and lower polarizing plate surfaces. The level of disturbing reflection was "C", the level of glittering was "A", and the level of moire was "D".

Comparative Example 4

In Example 7, Sample 1-3 was laminated in place of Sample 1-1 to the surface of lower polarizing plate, and the upper polarizing plate of the product was used as it was. Other constructions were the same as in Example 7. Sample 1-3 was produced in the same manner as Sample 1-1 except that in the production process of Example 1, Coating Solution C for Light-Scattering Layer was used in place of Coating Solution A for Light-Scattering Layer and a low refractive index was not provided. The level of disturbing reflection was "B", the level of glittering was "B", and the level of moire was "D". Furthermore, when viewed at the front, the picture was dark and looked poorly.

Comparative Example 5

In Example 7, Sample 1-3 was laminated in place of Sample 1-1 to the surface of lower polarizing plate, and a TAC (triacetyl cellulose) film without a light-scattering layer was laminated in place of Sample 1-1 to the surface of upper polarizing plate. Other constructions were the same as in Example 7. The level of disturbing reflection was "A", the level of glittering was "C", and the level of moire was "A". Furthermore, when viewed at the front, the picture was dark, nevertheless, the light brownish looking of the screen was also bad.

The results of Examples and Comparative Examples are shown together in Table 1.

TABLE 1

| | Disturbing Reflection | Glittering | Moire | Others |
|---|---|---|---|---|
| Example 1 | A | A | A | |
| Example 2 | A | A | A | |
| Comparative Example 1 | B | B | D | |
| Comparative Example 2 | A | A | C | |
| Example 3 | A | A | B | |
| Example 4 | A | A | B | |
| Example 5 | A | A | A | |
| Example 6 | A | A | A | |
| Example 7 | A | A | B | |
| Example 8 | A | A | A | |
| Comparative Example 3 | C | A | D | |
| Comparative Example 4 | B | B | A | dark picture |
| Comparative Example 5 | A | C | A | dark picture, lightly brownished due to reflected light |

TABLE 2

| Sample Film | Specular Reflectance Rs (%) | Scattering Coefficient A | Reflection Coefficient B |
|---|---|---|---|
| 1-1 | 1.5 | 3.4 | 2.3 |
| 1-2 | 2.0 | 4.3 | 1.8 |
| 1-3 | 1.4 | 5.3 | 0.8 |
| TAC (triacetyl cellulose) film | 4.1 | 1.0 | 7.1 |

According to the present invention, as a result of studies, by controlling the materials and the production methods of a protective film of a polarizing plate, a light-diffusing layer, a light-condensing film, a backlight, a surface film and a liquid crystal cell, a liquid crystal display device having a wide viewing angle can be provided, where, despite the same construction as that of the conventional liquid crystal display device, the disturbing reflection is decreased, the bright-room contrast is enhanced and high display uniformity is ensured without causing generation of a moire interference pattern even when a strongly converging bright backlight is used.

The entire disclosure of each and every foreign patent application from which the benefit of foreign priority has been claimed in the present application is incorporated herein by reference as if fully set forth.

What is claimed is:

1. A matrix-type liquid crystal display device, comprising:
   a liquid crystal panel comprising:
   a pair of substrates disposed to face each other with at least one of the pair of substrates having an electrode;
   a liquid crystal layer interposed between the pair of substrates;
   a pair of polarizing plates disposed to sandwich the liquid crystal layer, each having a polarizing film and a protective film provided directly or indirectly on at least one surface of the polarizing film; and
   an optically compensatory film disposed in at least one of spaces between the liquid crystal layer and the pair of polarizing films;
   a backlight comprising a light source;
   a first optical member having a light-condensing property; and
   a second optical member having a surface scattering function,
   wherein the second optical member having a surface scattering function is a light-scattering film comprising:
   a transparent support; and
   at least a light-scattering layer directly or indirectly on the transparent support, and
   wherein in the light-scattering film, assuming that when nearly parallel light rays are made incident on a surface of the light-scattering film at an incident angle of 5°, a reflectance for an angle θ in a light-receiving part measured in a plane containing a film normal line and an incident direction is R(θ) and a value obtained by normalizing R(θ) by a reflectance of regular reflection is Rrel(θ) and further that a value calculated from the maximum variation |dRrel(θ)/dθ|max for the angle θ is a scattering coefficient A (formula 1), a reflection coefficient B (formula 2) calculated from the scattering coefficient A and a 5° specular reflectance Rs is from 1.5 to 4.5:

Scattering coefficient $A = 1/|dRrel(\theta)/d\theta|max$ (Formula 1)

Reflection coefficient $B = 2.2 \times \log 10(Rs) - 7.5 \times \log 10(A) + 5.9$. (Formula 2)

2. The matrix-type liquid crystal display device according to claim 1, wherein the first optical member having a light-condensing property collects light by a periodic concave-convex structure and a pitch of the periodic concave-convex structure is smaller than a periodicity pitch of display pixels.

3. The matrix-type liquid crystal display device according to claim 1, wherein the first optical member having a light-condensing property has a linear periodic concave-convex structure and a direction of the linear periodic concave-convex structure intersects a direction of pixel periodicity.

4. The matrix-type liquid crystal display device according to claim 1, wherein the second optical member having a surface scattering function is disposed directly or indirectly on a surface of the protective film of the polarizing film on a backlight side.

5. The matrix-type liquid crystal display device according to claim 1, wherein the scattering coefficient A is from 1.5 to 4.5.

6. The matrix-type liquid crystal display device according to claim 1, which is in a vertically aligned display mode.

7. The matrix-type liquid crystal display device according to claim 1, wherein
the backlight, the first optical member having a light-condensing property, and the liquid crystal layer are arranged in this order; and
one of the pair of polarizing plates is a polarizing plate on a viewing side, the polarizing plate on the viewing side having the second optical member having a surface scattering function formed thereon as a protective film at an outermost surface of the polarizing plate on the viewing side.

* * * * *